(12) United States Patent
Chen et al.

(10) Patent No.: US 11,792,389 B2
(45) Date of Patent: Oct. 17, 2023

(54) BI-DIRECTIONAL INTER PREDICTION METHOD AND APPARATUS

(71) Applicant: HUAWEI TECHNOLOGIES CO., LTD., Guangdong (CN)

(72) Inventors: Huanbang Chen, Shenzhen (CN); Jianle Chen, San Diego, CA (US); Haitao Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 17/189,953

(22) Filed: Mar. 2, 2021

(65) Prior Publication Data

US 2021/0185324 A1    Jun. 17, 2021

Related U.S. Application Data

(63) Continuation of application No. PCT/CN2019/104462, filed on Sep. 4, 2019.

(60) Provisional application No. 62/734,226, filed on Sep. 20, 2018, provisional application No. 62/727,534, (Continued)

(51) Int. Cl.
| | |
|---|---|
| *H04N 19/105* | (2014.01) |
| *H04N 19/159* | (2014.01) |
| *H04N 19/172* | (2014.01) |
| *H04N 19/176* | (2014.01) |
| *H04N 19/137* | (2014.01) |

(52) U.S. Cl.
CPC ........ *H04N 19/105* (2014.11); *H04N 19/137* (2014.11); *H04N 19/159* (2014.11); *H04N 19/172* (2014.11); *H04N 19/176* (2014.11)

(58) Field of Classification Search
None
See application file for complete search history.

(56) References Cited

U.S. PATENT DOCUMENTS

| | | |
|---|---|---|
| 2005/0117646 A1 | 6/2005 | Joch et al. |
| 2007/0047649 A1 | 3/2007 | Suzuki et al. |

(Continued)

FOREIGN PATENT DOCUMENTS

| | | |
|---|---|---|
| CN | 101309427 A | 11/2008 |
| CN | 103079072 A | 5/2013 |

(Continued)

OTHER PUBLICATIONS

Chen, Huanbang, et al., "CE4: Symmetrical MVD mode (Test 4.5.1)", Input document to JVET, Joint Video Experts Team (JVET) of ITU-T SG 16 WP 3 and ISO/IEC JTC 1/SC 29/WG 11, 12th Meeting: Macao, CN, Oct. 3-12, 2018, Doc. No. JVET-L0370-v1 (Year: 2018).*

(Continued)

*Primary Examiner* — Lindsay J Uhl
(74) *Attorney, Agent, or Firm* — Fish & Richardson P.C.

(57) ABSTRACT

Embodiments of this application disclose bi-directional inter prediction methods and apparatuses. In an embodiment, a method comprises: determining that a first reference picture index of a first reference picture list is associated with a current block to be predicted; determining that a second reference picture index of a second reference picture list is associated with the current block; and predicting the current block based on the first reference picture index and the second reference picture index.

18 Claims, 9 Drawing Sheets

Related U.S. Application Data filed on Sep. 5, 2018, provisional application No. 62/726,975, filed on Sep. 4, 2018.

(56) References Cited

U.S. PATENT DOCUMENTS

| | | | | |
|---|---|---|---|---|
| 2011/0080949 A1* | 4/2011 | Takahashi | ............... | H04N 19/58 375/240.12 |
| 2012/0230392 A1 | 9/2012 | Zheng et al. | | |
| 2013/0272409 A1 | 10/2013 | Seregin et al. | | |
| 2016/0065987 A1 | 3/2016 | Lee | | |
| 2017/0272744 A1* | 9/2017 | Liu | ......................... | H04N 19/51 |
| 2020/0304810 A1* | 9/2020 | Moon | ................... | H04N 19/136 |
| 2021/0385461 A1* | 12/2021 | Liu | ....................... | H04N 19/176 |

FOREIGN PATENT DOCUMENTS

| | | | | |
|---|---|---|---|---|
| CN | 103339936 | A | 10/2013 | |
| CN | 104365101 | A | 2/2015 | |
| CN | 104584558 | A | 4/2015 | |
| CN | 104717513 | A | 6/2015 | |
| CN | 112567753 | A | 3/2021 | |
| EP | 2840793 | A1 | 2/2015 | |
| JP | 2008154015 | A | 7/2008 | |
| JP | 2013016935 | A | 1/2013 | |
| JP | 2015516753 | A | 6/2015 | |
| KR | 20130116216 | A | 10/2013 | |
| KR | 20140122195 | A | 10/2014 | |
| RU | 2658137 | C2 | 6/2018 | |
| WO | 2011145601 | A1 | 11/2011 | |
| WO | 2018058526 | A1 | 4/2018 | |
| WO | 2018058622 | A1 | 4/2018 | |
| WO | WO-2020003262 | A1 * | 1/2020 | ........... H04N 19/172 |

OTHER PUBLICATIONS

Extended European Search Report in European Application No. 19858320.5, dated Aug. 24, 2021, 8 pages.
Office Action issued in Chinese Application No. 202011633839.0 dated Sep. 24, 2021, 17 pages (with English translation).
Office Action issued in Indian Application No. 202137010315 dated Feb. 1, 2022, 6 pages.
Chen et al., "CE4: Symmetrical mode for bi-prediction (Test 3.2)," Joint Video Experts Team (JVET) of ITU-T SG 16 WP 3 and ISO/IEC JTC 1/SC 29/WG 11, Document: JVET-K0188-v2, 11th Meeting: Ljubljana, SI, Jul. 10-18, 2018, 4 pages.
Choi et al., "CE4-related: Bilateral Motion Vector Prediction," Joint Video Exploration Team (JVET) of ITU-T SG 16 WP 3 and ISO/IEC JTC 1/SC 29/WG 11, Document: JVET-K0302-v3, 11th Meeting: Ljubljana, SI, Jul. 10-18, 2018, 8 pages.
Office Action issued in Japanese Application No. 2021-536143 dated May 23, 2022, 12 pages (with English translation).
ITU-T H.264, "Series H: Audiovisual and Multimedia Systems Infrastructure of audiovisual services—Coding of moving video; Advanced video coding for generic audiovisual services," Apr. 2017, 812 pages.
PCT International Search Report and Written Opinion issued in International Application No. PCT/CN2019/094106 dated Sep. 19, 2019, 17 pages (with English translation).
PCT International Search Report and Written Opinion issued in International Application No. PCT/CN2019/104462 dated Nov. 27, 2019, 15 pages (with English translation).
Schwarz et al., "An application of unified reference picture list for motion-compensated video compression", 2016 Picture Coding Symposium (PCS), Dec. 2016, 5 pages.
Office Action issued in Russian Application No. 2021108698/07(018716) dated Jun. 9, 2022, 13 pages (with English translation).
Office Action issued in Russian Application No. 2021108698/07(018716) dated Oct. 21, 2022, 11 pages (with English translation).
Office Action in Japanese Appln. No. 2021-536143, dated Dec. 12, 2022, 12 pages (with English translation).
Office Action in Korean Appln. No. 10-2021-7009929, dated Apr. 10, 2023, 13 pages (with English translation).

* cited by examiner

BI-DIRECTIONAL INTER PREDICTION METHOD AND APPARATUS

CROSS-REFERENCE TO RELATED APPLICATIONS

This application is a continuation of International Application No. PCT/CN2019/104462, filed on Sep. 4, 2019, which claims priority to U.S. Patent Application No. 62/726,975, filed on Sep. 4, 2018, to U.S. Patent Application No. 62/727,534, filed on Sep. 5, 2018, and to U.S. Patent Application No. 62/734,226, filed on Sep. 20, 2018. All of the aforementioned patent applications are hereby incorporated by reference in their entireties.

TECHNICAL FIELD

Embodiments of this application relate to the field of video picture coding technologies, and in particular, to a bi-directional inter prediction method and apparatus.

BACKGROUND

In a video coding technology, a prediction picture block of a current block may be generated based on only one reference picture block (this is referred to as unidirectional inter prediction), or a prediction picture block of a current block may be generated based on at least two reference picture blocks (this is referred to as bi-directional inter prediction). The at least two reference picture blocks may be from a same reference picture (frame) or different reference pictures.

To enable a decoder side and an encoder side to use a same reference picture block, the encoder side needs to send motion information of each picture block to the decoder side through a bitstream. Usually, motion information of the current block includes a reference picture index value, a motion vector predictor (MVP) flag, and a motion vector difference (MVD). The decoder side can find a correct reference picture block in a selected reference picture based on the reference picture index value, the MVP flag, and the MVD.

Correspondingly, in bi-directional inter prediction, the encoder side needs to send motion information of each picture block in each direction to the decoder side. Consequently, the motion information occupies a relatively large quantity of transmission resources. This reduces effective utilization of the transmission resources, a transmission rate, and coding compression efficiency.

SUMMARY

Embodiments of this application provide a bi-directional inter prediction method and apparatus, a video encoding device, and a video decoding device, to determine a reference picture index of a picture block according to a derivation method during encoding or decoding without transmitting the reference picture index of the picture block in a bitstream, so that transmission resources can be saved, and coding compression efficiency can be improved to some extent.

To achieve the foregoing objective, the following technical solutions are used in the embodiments of this application.

According to a first aspect, the present invention provides a bi-directional inter prediction method. The method includes:

determining a reference picture index $i_1$ of a first reference picture list as a first reference picture index that corresponds to a current block and that is of the first reference picture list, where a picture order count POC (picture order count) corresponding to the reference picture index $i_1$ is less than a POC of a current picture, a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_1$ is any reference picture index other than the reference picture index $i_1$ in reference picture indices of the first reference picture list, and the POC corresponding to the reference picture index $i_x$ is less than the POC of the current picture;

determining a reference picture index $i_2$ of a second reference picture list as a second reference picture index that corresponds to the current block and that is of the second reference picture list, where a POC corresponding to the reference picture index $i_2$ is greater than the POC of the current picture, a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture; and predicting the current block based on the first reference picture index and the second reference picture index, where the current picture includes the current block.

It should be understood that the reference picture index in the present invention may also be briefly referred to as an index.

According to a second aspect, the present invention provides a bi-directional inter prediction method. The method includes:

when a first group of conditions is satisfied, determining a reference picture index $i_1$ of a first reference picture list as a first reference picture index that corresponds to a current block and that is of the first reference picture list, where the first group of conditions includes at least the following condition 1 and condition 2:

condition 1: a POC corresponding to the reference picture index $i_1$ is less than a POC of a current picture; and condition 2: a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_x$ is any reference picture index other than the reference picture index $i_1$ in reference picture indices of the first reference picture list, and the POC corresponding to the reference picture index $i_x$ is less than the POC of the current picture;

when a second group of conditions is satisfied, determining a reference picture index $i_2$ of a second reference picture list as a second reference picture index that corresponds to the current block and that is of the second reference picture list, where the second group of conditions includes at least the following condition 11 and condition 12:

condition 11: a POC corresponding to the reference picture index $i_2$ is greater than the POC of the current picture; and condition 12: a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture; and predicting the current block based on the first reference picture index and the second reference picture index, where the current picture includes the current block.

It should be understood that, in the embodiments of the present invention, in addition to the condition 1 and the condition 2, the first group of conditions may further include another condition, and in addition to the condition 11 and the condition 12, the second group of conditions may further include another condition. These conditions include but are not limited to an optional execution condition in the prior art or an optional execution condition in standard evolution, and are not exhaustively enumerated in the embodiments of the present invention.

According to a third aspect; the present invention provides a bi-directional inter prediction method. The method includes:

allowing to determine a reference picture index $i_1$ of a first reference picture list as a first reference picture index that corresponds to a current block and that is of the first reference picture list, where a POC corresponding to the reference picture index $i_1$ is less than a POC of a current picture, a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_x$ is any reference picture index other than the reference picture index it in reference picture indices of the first reference picture list, and the POC corresponding to the reference picture index $i_x$ is less than the POC of the current picture;

allowing to determine a reference picture index $i_2$ of a second reference picture list as a second reference picture index that corresponds to the current block and that is of the second reference picture list, where a POC corresponding to the reference picture index $i_2$ is greater than the POC of the current picture, a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture; and predicting the current block based on the first reference picture index and the second reference picture index when the reference picture index $i_1$ is determined as the first reference picture index that corresponds to the current block and that is of the first reference picture list and the reference picture index $i_2$ is determined as the second reference picture index that corresponds to the current block and that is of the second reference picture list, where the current picture includes the current block.

According to the first aspect, the second aspect, or the third aspect of the present invention, in a possible design, the first reference picture list may correspond to a first direction, and the second reference picture list may correspond to a second direction. The first direction and the second direction may be respectively a forward direction and a backward direction, or a backward direction and a forward direction, or both the first direction and the second direction may be forward directions or backward directions. The direction may also be understood as a time sequence, and is not limited in the present invention.

According to the first aspect, the second aspect, or the third aspect of the present invention, in a possible design, the method is used on a decoding device, and correspondingly, the method further includes:

obtaining a first identifier, where a value of the first identifier is a first preset value (which may be but is not limited to 1 or 0), and is used to indicate to determine the reference picture index $i_1$ of the first reference picture list as the first reference picture index that corresponds to the current block and that is of the first reference picture list, and determine the reference picture index $i_2$ of the second reference picture list as the second reference picture index that corresponds to the current block and that is of the second reference picture list.

Optionally, when the value of the first identifier is a second preset value which is different from the first preset value, and may be but is not limited to 0 or 1), the first identifier may indicate that a bitstream needs to be parsed or another manner needs to be used to obtain a reference picture index of the current block.

According to the first aspect, the second aspect, or the third aspect of the present invention, in a possible design, when the first identifier is the first preset value (which may be but is not limited to 1 or 0), the first identifier may be further used to indicate to determine a second motion vector difference of the current block based on a first motion vector difference of the current block, and the method further includes:

obtaining the first motion vector difference of the current block: and obtaining the second motion vector difference of the current block based on the first motion vector difference according to the following formula:

$$mvd\_lY = -mvd\_lX.$$

Herein, mvd_lY represents the second motion vector difference, mvd_lX represents the first motion vector difference, one of the first motion vector difference and the second motion vector difference corresponds to the first reference picture list, and the other one of the first motion vector difference and the second motion vector difference corresponds to the second reference picture list.

Optionally, when the value of the first identifier is the second preset value (which is different from the first preset value, and may be but is not limited to 0 or 1), the first identifier may indicate that a bitstream needs to be parsed or another manner needs to be used to obtain the first motion vector difference and/or the second motion vector difference, of the current block, corresponding to the first reference picture list and/or the second reference picture list.

In short, when the value of the first identifier is the first preset value, the first identifier may indicate that first motion information and second motion information may be mutually derived. For example, the second motion information may be derived based on the first motion information, or the first motion information may be derived based on the second motion information. More specifically, a second motion vector may be derived based on a first motion vector, or a first motion vector may be derived based on a second motion vector. The second motion vector difference may be derived based on the first motion vector difference, or the first motion vector difference may be derived based on the second motion vector difference.

In this case, not all motion information (such as MVDs) needs to be transmitted in a bitstream, so that resources for transmitting the bitstream are reduced, thereby improving bitstream transmission efficiency.

Further, when the first motion vector is derived based on the second motion vector, or the second motion vector is derived based on the first motion vector, the first reference picture index and the second reference picture index may be determined through derivation. In other words, the first reference picture index and the second reference picture index may be obtained without parsing a bitstream.

In conclusion, it can be learned that, when the value of the first identifier is the first preset value, the first identifier may be used to indicate that the reference picture index of the current block may be obtained or determined through derivation. Specifically, when the value of the first identifier is the first preset value, the first identifier may be used to indicate to determine the reference picture index $i_1$ of the first reference picture list as the first reference picture index that corresponds to the current block and that is of the first reference picture list, and determine the reference picture index $i_2$ of the second reference picture list as the second reference picture index that corresponds to the current block and that is of the second reference picture list. In this case, a reference picture index may not be transmitted in a bitstream, so as to improve bitstream transmission efficiency.

Further, when the value of the first identifier is the second preset value the first identifier may be used to indicate that the first motion vector is not derived based on the second motion vector, or the second motion vector is not derived based on the first motion vector. In this case, a bitstream needs to be parsed to obtain the first reference picture index and the second reference picture index of the current block.

Further, when the value of the first identifier is the second preset value, the first identifier may be used to indicate that the first motion vector difference is not derived based on the second motion vector difference, or the second motion vector difference is not derived based on the first motion vector difference. In this case, a bitstream needs to be parsed to obtain the first reference picture index and the second reference picture index of the current block.

According to the first aspect, the second aspect, or the third aspect of the present invention, in a possible design, the method further includes:
  obtaining a first predicted motion vector and a second predicted motion vector;
  determining the first motion vector based on the first predicted motion vector and the first motion vector difference; and
  determining the second motion vector based on the second predicted motion vector and the second motion vector difference.

The predicting the current block based on the first reference picture index and the second reference picture index includes: predicting the current block based on the first reference picture index, the second reference picture index, the first reference picture list, the second reference picture list, the first motion vector, and the second motion vector.

Optionally, in a specific implementation process, the first predicted motion vector and the second predicted motion vector may be obtained through parsing and/or through derivation in the embodiments of the present invention, the first motion vector difference and the second motion vector difference may also be obtained through parsing and/or through derivation in the embodiments of the present invention, the first reference picture index and the second reference picture index may be determined according to the foregoing determining method, and the first reference picture list and the second reference picture list may be obtained from a bitstream or may be constructed. After these pieces of motion information are complete, the current block may be predicted. A specific prediction method may be implemented according to the prior art.

According to the foregoing method, an MVD in one direction may be derived based on an MVD in another direction, and the reference picture index may be determined according to a specific rule. In this way, for two pieces of motion information of the current block, at least one MVD and two reference picture indices may not be transmitted in a bitstream, thereby saving resources for transmitting the bitstream.

According to the first aspect, the second aspect, or the third aspect of the present invention, in a possible design, before the obtaining a first identifier, the method further includes: determining that a preset condition is satisfied, where the preset condition includes:
  the first reference picture list has a first index, the second reference picture list has a second index, and the POC of the current picture is between a POC corresponding to the first index and a POC corresponding to the second index.

For example, this may also be represented as that the following condition is satisfied:

(POC_Cur−POC_listX)*(POC_listY−POC_Cur)>0.

Herein, POC_Cur may represent the POC of the current picture, POC_listX may represent a POC of a reference picture in the first reference picture list, and POC_listY may represent a POC of a reference picture in the second reference picture list.

According to the first aspect, the second aspect, or the third aspect of the present invention, in a possible design, before the obtaining a first identifier, the method further includes: determining that a preset condition is satisfied, where the preset condition includes that an obtained motion vector residual identifier that is of the current picture and that corresponds to the second reference picture list is a third preset value. For example, mvd_l1_zero_flag of the current picture is 0.

According to the first aspect, the second aspect, or the third aspect of the present invention, in a possible design, when (POC_Cur−POC_listX)*(POC_listY−POC_Cur)>0, a picture having a smallest POC difference from the picture in which the to-be-processed block (that is, the current block) is located is determined as a first target reference picture in the first reference picture list of the to-be-processed block, where a POC of the first target reference picture is less than the POC of the picture in which the to-be-processed block is located; and a picture having a smallest POC difference from the picture in which the to-be-processed block is located is determined as a second target reference picture in the second reference picture list of the to-be-processed block, where a POC of the second target reference picture is greater than the POC of the picture in which the to-be-processed block is located. When both the first target reference picture and the second target reference picture exist, a reference picture index of the first target reference picture in the first reference picture list is it, and a reference picture index of the second target reference picture in the second reference picture list is $i_2$.

Optionally, when the first target reference picture or the second target reference picture does not exist, a picture having a smallest POC difference from the picture in which the to-be-processed block is located is determined as a third target reference picture in the first reference picture list of the to-be-processed block, where a POC of the third target reference picture is greater than the POC of the picture in which the to-be-processed block is located; and a picture having a smallest POC difference from the picture in which the to-be-processed block is located is determined as a fourth target reference picture in the second reference picture list of the to-be-processed block, where a POC of the fourth target reference picture is less than the POC of the picture in which the to-be-processed block is located. When both the third target reference picture and the fourth target reference picture exist, an index of the fourth target reference picture in the second reference picture list is $i_2$, and a reference picture index of the third target reference picture in the first reference picture list is $i_1$.

According to a fourth aspect, a bi-directional inter prediction apparatus is provided. The apparatus includes:
  a determining unit, configured to: determine a reference picture index $i_1$ of a first reference picture list as a first reference picture index that corresponds to a current block and that is of the first reference picture list, where a POC corresponding to the reference picture index $i_1$ is less than a POC of a current picture, a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_x$ is any reference picture index other than the reference picture index it in reference picture indices of the first reference picture list, and the POC corresponding to the reference picture index $i_x$ is less than the POC of the current picture; and determine a reference picture index $i_2$ of a second reference picture list as a second reference picture index that corresponds to the current block and that is of the second reference picture list, where a POC corresponding to the reference picture index $i_2$ is greater than the POC of the current picture, a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture; and
  an inter prediction processing unit, configured to predict the current block based on the first reference picture index and the second reference picture index, where the current picture includes the current block.

According to the fourth aspect, in a possible design, the apparatus further includes an obtaining unit, configured to obtain a first identifier, where a value of the first identifier is a first preset value, and when the value of the first identifier is the first preset value, the first identifier is used to indicate to determine the reference picture index $i_1$ of the first reference picture list as the first reference picture index that corresponds to the current block and that is of the first reference picture list, and determine the reference picture index $i_2$ of the second reference picture list as the second reference picture index that corresponds to the current block and that is of the second reference picture list.

According to the fourth aspect, in a possible design, when the first identifier is the first preset value, the first identifier is further used to indicate to determine a second motion vector difference of the current block based on a first motion vector difference of the current block; the obtaining unit is further configured to obtain the first motion vector difference of the current block; and the determining unit is further configured to obtain the second motion vector difference of the current block based on the first motion vector difference according to the following formula:

$$mvd\_lY = -mvc\_lX.$$

Herein, mvd_lY represents the second motion vector difference, mvd_lX represents the first motion vector difference, one of the first motion vector difference and the second motion vector difference belongs to motion information corresponding to the first reference picture list, and the other one of the first motion vector difference and the second motion vector difference belongs to motion information corresponding to the second reference picture list.

According to the fourth aspect, in a possible design, the obtaining unit is specifically configured to obtain a first predicted motion vector and a second predicted motion vector; the determining unit is configured to: determine a first motion vector based on the first predicted motion vector and the first motion vector difference, and determine a second motion vector based on the second predicted motion vector and the second motion vector difference; and the inter prediction processing unit is configured to predict the current block based on the first reference picture index, the second reference picture index, the first reference picture list, the second reference picture list; the first motion vector, and the second motion vector.

During specific implementation, the foregoing units (virtual modules) include but are not limited to discrete computing modules or a same integrated computing module. Implementation forms are not exhaustively enumerated. Different names are merely used for differentiation between functions, and should not constitute any unnecessary limitation on a structure.

According to a fifth aspect, the present invention provides a bi-directional inter prediction method, including:
  when auxiliary information of a to-be-processed block satisfies a preset condition, parsing a bitstream to obtain indication information, where the indication information is used to indicate an obtaining manner of a first motion vector and an obtaining manner of a second motion vector, the first motion vector is a motion vector that points to a reference picture in a first reference picture list of the to-be-processed block, and the second motion vector is a motion vector that points to a reference picture in a second reference picture list of the to-be-processed block;

determining the first motion vector and the second motion vector based on the obtaining manners indicated by the indication information; and determining a predictor of the to-be-processed block based on the first motion vector, the second motion vector, a first reference picture index, and a second reference picture index, where the first reference picture index is used to indicate the reference picture to which the first motion vector points in the first reference picture list, and the second reference picture index is used to indicate the reference picture to which the second motion vector points in the second reference picture list.

According to a sixth aspect, the present invention provides a bi-directional inter prediction apparatus, including: an obtaining unit, configured to: when auxiliary information of a to-be-processed block satisfies a preset condition, parse a bitstream to obtain indication information, where the indication information is used to indicate an obtaining manner of a first motion vector and an obtaining manner of a second motion vector, the first motion vector is a motion vector that points to a reference picture in a first reference picture list of the to-be-processed block, and the second motion vector is a motion vector that points to a reference picture in a second reference picture list of the to-be-processed block; and a determining unit, configured to determine the first motion vector and the second motion vector based on the obtaining manners indicated by the indication information, and determine a predictor of the to-be-processed block based on the first motion vector, the second motion vector, a first reference picture index, and a second reference picture index, where the first reference picture index is used to indicate the reference picture to which the first motion vector points in the first reference picture list, and the second reference picture index is used to indicate the reference picture to which the second motion vector points in the second reference picture list.

The fifth aspect and the sixth aspect describe a method and an apparatus that correspond to each other. In the following possible designs, only the method is used as an example to describe possible implementation solutions, and details are not described on an apparatus side.

According to the fifth aspect or the sixth aspect, in a possible design, the indication information includes a first identifier and a fifth identifier, and the parsing a bitstream to obtain indication information includes: parsing the bitstream to obtain the first identifier; and when the first identifier is 0, parsing the bitstream to obtain the fifth identifier. Correspondingly, the determining the first motion vector and the second motion vector based on the obtaining manners indicated by the indication information includes:

when the first identifier is 1, parsing the bitstream to obtain a first predicted motion vector index and/or a first motion vector residual; calculating the first motion vector based on the first predicted motion vector index and/or the first motion vector residual; and deriving the second motion vector based on the first motion vector, where the first motion vector and the second motion vector are in a preset mathematical relationship;

when the first identifier is 0 and the fifth identifier is 1, parsing the bitstream to obtain a second predicted motion vector index and/or a second motion vector residual; calculating the second motion vector based on the second predicted motion vector index and/or the second motion vector residual; and deriving the first motion vector based on the second motion vector, where the first motion vector and the second motion vector are in a preset mathematical relationship; or when the first identifier is 0 and the fifth identifier is 0, parsing the bitstream to obtain a first predicted motion vector index and/or a first motion vector residual; calculating the first motion vector based on the first predicted motion vector index and/or the first motion vector residual; parsing the bitstream to obtain a second predicted motion vector index and/or a second motion vector residual; and calculating the second motion vector based on the second predicted motion vector index and/or the second motion vector residual.

According to the fifth aspect or the sixth aspect, in a possible design, the indication information includes a second identifier and a third identifier, and the parsing a bitstream to obtain indication information includes: parsing the bitstream to obtain the second identifier; and when the second identifier is 1, parsing the bitstream to obtain the third identifier. Correspondingly, the determining the first motion vector and the second motion vector based on the obtaining manners indicated by the indication information includes: when the second identifier is 0, parsing the bitstream to obtain a first predicted motion vector index and/or a first motion vector residual; calculating the first motion vector based on the first predicted motion vector index and/or the first motion vector residual; parsing the bitstream to obtain a second predicted motion vector index and/or a second motion vector residual; and calculating the second motion vector based on the second predicted motion vector index and/or the second motion vector residual; or when the second identifier is 1 and the third identifier is a first value, parsing the bitstream to obtain a first predicted motion vector index and/or a first motion vector residual; calculating the first motion vector based on the first predicted motion vector index and/or the first motion vector residual; and deriving the second motion vector based on the first motion vector, where the first motion vector and the second motion vector are in a preset mathematical relationship; or when the second identifier is 1 and the third identifier is a second value, parsing the bitstream to obtain a second predicted motion vector index and/or a second motion vector residual; calculating the second motion vector based on the second predicted motion vector index and/or the second motion vector residual; and deriving the first motion vector based on the second motion vector, where the first motion vector and the second motion vector are in a preset mathematical relationship, and the first value is not equal to the second value.

According to the fifth aspect or the sixth aspect, in a possible design, the indication information includes a second identifier, and the parsing a bitstream to obtain indication information includes:

parsing the bitstream to obtain the second identifier.

Correspondingly, the determining the first motion vector and the second motion vector based on the obtaining manners indicated by the indication information includes:

when the second identifier is 0, parsing the bitstream to obtain a first predicted motion vector index and/or a first motion vector residual; calculating the first motion vector based on the first predicted motion vector index and/or the first motion vector residual; parsing the bitstream to obtain a second predicted motion vector index and/or a second motion vector residual; and calculating the second motion vector based on the second predicted motion vector index and/or the second motion vector residual; or when the second identifier is 1, parsing the bitstream to obtain a first predicted motion vector index and/or a first motion vector residual; calculating the first motion vector based on the first predicted motion vector index and/or the first motion vector residual; and deriving the second motion vector based on the first motion vector, where the first motion vector and the second motion vector are in a preset mathematical relationship.

According to the fifth aspect or the sixth aspect, in a possible design, that the first motion vector and the second motion vector are in a preset mathematical relationship includes: the first motion vector and the second motion vector are equal in size and opposite in direction, and/or the first motion vector residual and the second motion vector residual are equal in size and opposite in direction.

According to the fifth aspect or the sixth aspect, in a possible design, the auxiliary information includes a quantity of reference pictures of the to-be-processed block, and that the auxiliary information of the to-be-processed block satisfies the preset condition includes: the quantity of reference pictures of the to-be-processed block is greater than or equal to 2.

According to the fifth aspect or the sixth aspect, in a possible design, the auxiliary information includes a picture order count (POC) relationship between a picture in which the to-be-processed block is located and a reference picture of the to-be-processed block, and that the auxiliary information of the to-be-processed block satisfies the preset condition includes:

POC_Cur−POC_listX=POC_listY−POC_Cur.

Herein, POC_Cur is a POC of the picture in which the to-be-processed block is located, POC_listX is a POC of the reference picture of the to-be-processed block in the first reference picture list, and POC_listY is a POC of the reference picture of the to-be-processed block in the second reference picture list.

According to the fifth aspect or the sixth aspect, in a possible design, the auxiliary information includes a picture order count (POC) relationship between a picture in which the to-be-processed block is located and a reference picture of the to-be-processed block, and that the auxiliary information of the to-be-processed block satisfies the preset condition includes:

(POC_Cur−POC_listX)*(POC_listY−POC_Cur)>0.

Herein, POC_Cur is a POC of the picture in which the to-be-processed block is located, POC_listX is a POC of the reference picture of the to-be-processed block in the first reference picture list, and POC_listY is a POC of the reference picture of the to-be-processed block in the second reference picture list.

According to the fifth aspect or the sixth aspect, in a possible design, the auxiliary information includes a temporal identifier (Temporal ID) of a picture in which the to-be-processed block is located, and that the auxiliary information of the to-be-processed block satisfies the preset condition includes: the temporal identifier of the picture in which the to-be-processed block is located is greater than or equal to a preset value.

According to the fifth aspect or the sixth aspect, in a possible design, the auxiliary information includes a motion vector residual (mvd_l1_zero_flag) identifier of the to-be-processed block, and that the auxiliary information of the to-be-processed block satisfies the preset condition includes: the motion vector residual identifier of the to-be-processed block indicates that a motion vector residual of the to-be-processed block is 0, where the motion vector residual is the first motion vector residual or the second motion vector residual.

According to the fifth aspect or the sixth aspect, in a possible design, before the determining a predictor of the to-be-processed block, the method further includes:
when the first motion vector is derived based on the second motion vector, or the second motion vector is derived based on the first motion vector, determining the first reference picture index and the second reference picture index based on the preset condition that the auxiliary information satisfies: or
when the first motion vector is not derived based on the second motion vector, and the second motion vector is not derived based on the first motion vector, parsing the bitstream to obtain the first reference picture index and the second reference picture index.

According to the fifth aspect or the sixth aspect, in a possible design, the determining the first reference picture index and the second reference picture index includes: setting each of the first reference picture index and the second reference picture index to a preset constant. The preset constant may be 0.

According to the fifth aspect or the sixth aspect, in a possible design, when POC_Cur−POC_listX=POC_listY−POC_Cur, the determining the first reference picture index and the second reference picture index includes: determining, as a first target reference picture in the first reference picture list of the to-be-processed block, a picture having a smallest POC difference from the picture in which the to-be-processed block is located, where a POC of the first target reference picture is less than the POC of the picture in which the to-be-processed block is located; searching the second reference picture list of the to-be-processed block for a second target reference picture, where a POC of the second target reference picture satisfies: POC_Cur−POC_1=POC_2−POC_Cur, POC_1 is the POC of the first target reference picture, and POC_2 is the POC of the second target reference picture; and when both the first target reference picture and the second target reference picture exist, setting the first reference picture index to an identifier of the first target reference picture, and setting the second reference picture index to an identifier of the second target reference picture.

According to the fifth aspect or the sixth aspect, in a possible design, the method further includes:
when the first target reference picture or the second target reference picture does not exist, determining, as a third target reference picture in the first reference picture list of the to-be-processed block, a picture having a smallest POC difference from the picture in which the to-be-processed block is located, where a POC of the third target reference picture is greater than the POC of the picture in which the to-be-processed block is located; searching the second reference picture list of the to-be-processed block for a fourth target reference picture, where a POC of the fourth target reference picture satisfies: POC_Cur−POC_3=POC_4−POC_Cur, POC_3 is the POC of the third target reference picture, and POC_4 is the POC of the fourth target reference picture; and setting the first reference picture index to an identifier of the third target reference picture, and setting the second reference picture index to an identifier of the fourth target reference picture.

According to the fifth aspect or the sixth aspect, in a possible design, when (POC_Cur−POC_listX)*(POC_listX POC_Cur)>0, the determining the first reference picture index and the second reference picture index includes:
determining, as a first target reference picture in the first reference picture list of the to-be-processed block, a picture having a smallest POC difference from the picture in which the to-be-processed block is located, where a POC of the first target reference picture is less than the POC of the picture in which the to-be-processed block is located;
determining, as a second target reference picture in the second reference picture list of the to-be-processed block, a picture having a smallest POC difference from the picture in which the to-be-processed block is located, where a POC of the second target reference picture is greater than the POC of the picture in which the to-be-processed block is located; and
when both the first target reference picture and the second target reference picture exist, setting the first reference picture index to an identifier of the first target reference picture, and setting the second reference picture index to an identifier of the second target reference picture.

According to the fifth aspect or the sixth aspect, in a possible design, the method further includes:
when the first target reference picture or the second target reference picture does not exist, determining, as a third target reference picture in the first reference picture list of the to-be-processed block, a picture having a smallest POC difference from the picture in which the to-be-processed block is located, where a POC of the third target reference picture is greater than the POC of the picture in which the to-be-processed block is located; determining, as a fourth target reference picture in the second reference picture list of the to-be-processed block, a picture having a smallest POC difference from the picture in which the to-be-processed block is located, where a POC of the fourth target reference picture is less than the POC of the picture in which the to-be-processed block is located; and setting the first reference picture index to an identifier of the third target reference picture, and setting the second reference picture index to an identifier of the fourth target reference picture.

According to a seventh aspect, the present invention provides a bi-directional inter prediction method, including:
when at least a syntax element in a bitstream indicates that a second motion vector difference of a current picture needs to be parsed, obtaining a first identifier; obtaining a first motion vector difference of a current block; and when a value of the first identifier is a first preset value, determining a second motion vector difference of the current block based on the first motion vector difference, where the first motion vector difference belongs to motion information of the current block in a first direction, the second motion vector difference belongs to motion information of the current block in a second direction, and the first motion vector difference and the second motion vector difference are used to predict the current block.

According to an eighth aspect, a bi-directional inter prediction method is provided, including: obtaining indication information used to indicate to determine, second motion information based on first motion information, where the first motion information is motion information of a current block in a first direction, and the second motion information is motion information of the current block in a second direction; obtaining the first motion information; and determining the second motion information based on the obtained first motion information. In this way, a prediction sample of the current block can be determined based on the obtained first motion information and the determined second motion information.

According to the bi-directional inter prediction method provided in this application, after the indication information is obtained, the second motion information is determined based on the first motion information. In this way, a bitstream needs to include only the indication information and the first motion information, and no longer needs to include the second motion information. Compared with the prior art in which a bitstream includes motion information of each picture block in each direction, the bi-directional inter prediction method provided in this application effectively reduces motion information included in the bitstream, and improves effective utilization of transmission resources, a transmission rate, and a coding rate.

Optionally, in a possible implementation of this application, a method for "determining the second motion information based on the first motion information" is: obtaining an index value of a first reference picture in the first motion information, and determining a picture order count of the first reference picture based on the index value of the first reference picture and a first reference picture list, where the first reference picture is a reference picture of the current block in the first direction, and the index value of the first reference picture is a number of the first reference picture in the first reference picture list; obtaining an index value of a second reference picture, and determining a picture order count of the second reference picture based on the index value of the second reference picture and a second reference picture list, where the second reference picture is a reference picture of the current block in the second direction, and the index value of the second reference picture is a number of the second reference picture in the second reference picture list; determining a first motion vector based on a first motion vector difference and a first motion vector predictor flag that are in the first motion information, where the first motion vector is a motion vector of the current block in the first direction; and determining a second motion vector in the second motion information according to the following formula:

$$mv\_lY = \frac{POC\_Cur - POC\_listY}{POC\_Cur - POC\_listX} \times mv\_lX.$$

In the formula, mv_lY represents the second motion vector, POC_Cur represents a picture order count of a current picture, POC_listX represents the picture order count of the first reference picture, POC_listY represents the picture order count of the second reference picture, mv_lX represents the first motion vector, and the second motion vector is a motion vector of the current block in the second direction.

Optionally, in another possible implementation of this application, a method for "determining the second motion information based on the first motion information" is: obtaining an index value of a first reference picture in the first motion information, and determining a picture order count of the first reference picture based on the index value of the first reference picture and a first reference picture list, where the first reference picture is a reference picture of the current block in the first direction, and the index value of the first reference picture is a number of the first reference picture in the first reference picture list; obtaining an index value of a second reference picture, and determining a picture order count of the second reference picture based on the index value of the second reference picture and a second reference picture list, where the second reference picture is a reference picture of the current block in the second direction, and the index value of the second reference picture is a number of the second reference picture in the second reference picture list; determining a first motion vector based on a first motion vector difference and a first motion vector predictor flag that are in the first motion information, where the first motion vector is a motion vector of the current block in the first direction: and when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, determining a second motion vector in the second motion information according to a formula mv_lY=−mv_lX, where in this formula, mv_lY represents the second motion vector, mv_lX represents the first motion vector, and the second motion vector is a motion vector of the current block in the second direction.

Optionally, in another possible implementation of this application, a method for "determining the second motion information based on the first motion information" is: determining a second motion vector in the second motion information according to a formula mv_lY=−mv_lX, where in this formula, mv_lY represents the second motion vector, mv_lX represents a first motion vector, and the second motion vector is a motion vector of the current block in the second direction.

Both "the first reference picture is a forward reference picture of the current block and the second reference picture is a backward reference picture of the current block" and "the first reference picture is a backward reference picture of the current block and the second reference picture is a forward reference picture of the current block" may be represented by using a formula. (POC_Cur−POC_listX)* (POC_listX−POC_Cur)>0, or may be represented by using a formula POC_listY=2*POC_Cur−POC_listX. This is not specifically limited in this application.

In addition, both "the first reference picture and the second reference picture each are a forward reference picture of the current block" and "the first reference picture and the second reference picture each are a backward reference picture of the current block" may be represented by using a formula (POC_Cur−POC_listX)*(POC_listY−POC_Cur) <0.

Optionally, in another possible implementation of this application, a method fix "determining the second motion information based on the first motion information" is: obtaining an index value of a first reference picture and a first motion vector difference that are in the first motion information, and determining a picture order count of the first reference picture based on the index value of the first reference picture and a first reference picture list, where the first reference picture is a reference picture of the current block in the first direction, and the index value of the first reference picture is a number of the first reference picture in the first reference picture list; obtaining an index value of a second reference picture, determining a picture order count of the second reference picture based on the index value of the second reference picture and a second reference picture list, and determining a second predicted motion vector based on the index value of the second reference picture and a second candidate predicted motion vector list, where the second predicted motion vector is a predicted motion vector of the current block in the second direction, the second reference picture is a reference picture of the current block in the second direction, and the index value of the second reference picture is a number of the second reference picture in the second reference picture list; determining a second motion vector difference in the second motion information according to the following formula:

$$\text{mvd\_lY} = \frac{\text{POC\_Cur} - \text{POC\_listY}}{\text{POC\_Cur} - \text{POC\_listX}} \times \text{mvd\_lX},$$

where
in the formula, mvd_lY represents the second motion vector difference, POC_Cur represents a picture order count of a current picture, POC_listX represents the picture order count of the first reference picture, POC_listY represents the picture order count of the second reference picture, and mvd_lX represents the first motion vector difference; and determining a second motion vector based on the second predicted motion vector and the second motion vector difference, where the second motion vector is a motion vector of the current block in the second direction.

Optionally, in another possible implementation of this application, a method for "determining the second motion information based on the first motion information" is: obtaining an index value of a first reference picture and a first motion vector that are in the first motion information, and determining a picture order count of the first reference picture based on the index value of the first reference picture and a first reference picture list, where the first reference picture is a reference picture of the current block in the first direction, and the index value of the first reference picture is a number of the first reference picture in the first reference picture list; obtaining an index value of a second reference picture, determining a picture order count of the second reference picture based on the index value of the second reference picture and a second reference picture list, and determining a second predicted motion vector based on the index value of the second reference picture and a second candidate predicted motion vector list, where the second predicted motion vector is a predicted motion vector of the current block in the second direction, the second reference picture is a reference picture of the current block in the second direction, and the index value of the second reference picture is a number of the second reference picture in the second reference picture list; when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, determining a second motion vector difference in the second motion information according to a formula mvd_lY=−mvd_lX, where in this formula mvd_lY represents the second motion vector difference, and mvd_lX represents a first motion vector difference; and determining a second motion vector based on the second predicted motion vector and the second motion vector difference, where the second motion vector is a motion vector of the current block in the second direction.

Optionally, in another possible implementation of this application, a method for "determining the second motion information based on the first motion information" is: determining a second motion vector difference in the second motion information according to a formula mvd_lY=−mvd_lX, where in this formula, mvd_lY represents the second motion vector difference, and mvd_lX represents a first motion vector difference; and determining a second motion vector based on a second predicted motion vector and the second motion vector difference, where the second motion vector is a motion vector of the current block in the second direction.

Likewise, both "the first reference picture is a forward reference picture of the current block and the second reference picture is a backward reference picture of the current block" and "the first reference picture is a backward reference picture of the current block and the second reference picture is a forward reference picture of the current block" may be represented by using a formula (POC_Cur−POC_listX)*(POC_listY−POC_Cur)>0; or may be represented by using a formula POC_listY=2*POC_Cur−POC_listX. This is not specifically limited in this application.

Both "the first reference picture and the second reference picture each are a forward reference picture of the current block" and "the first reference picture and the second reference picture each are a backward reference picture of the current block" may be represented by using a formula (POC_Cur−POC_listX)*(POC_listY−POC_Cur)<0.

It may be learned that, the bi-directional inter prediction method provided in this application may be: determining the second motion vector based on the first motion vector, or may be: determining the second motion vector difference based on the first motion vector difference, and determining the second motion vector based on the second motion vector difference.

Optionally, in another possible implementation of this application, a method for "obtaining an index value of a second reference picture" is: calculating a first picture order count based on the picture order count of the current picture and the picture order count of the first reference picture according to a formula POC_listY0=2*POC_Cur−POC_listX, where POC_Cur represents the picture order count of the current picture, POC_listX represents the picture order count of the first reference picture, and POC_listY represents the first picture order count; and when the second reference picture list includes the first picture order count, determining, as the index value of the second reference picture, a number of a reference picture represented by the first picture order count in the second reference picture list.

Optionally, in another possible implementation of this application, a method for "obtaining an index value of a second reference picture" is: calculating a second picture order count based on the picture order count of the current picture and the picture order count of the first reference picture according to a formula (POC_Cur−POC_listX)*(POC_listY0'−POC_Cur)>0, where POC_listY0' represents the second picture order count; and when the second reference picture list includes the second picture order count, determining, as the index value of the second reference picture, a number of a reference picture represented by the second picture order count in the second reference picture list.

Optionally, in another possible implementation of this application, a method for "obtaining an index value of a second reference picture" is: calculating a third picture order count based on the picture order count of the current picture and the picture order count of the first reference picture according to a formula POC_listX≠POC_listY0", where POC_listY0" represents the third picture order count; and determining, as the index value of the second reference picture, a number of a reference picture represented by the third picture order count in the second reference picture list.

Optionally, in another possible implementation of this application, a method for "obtaining an index value of a second reference picture" is: calculating a first picture order count based on the picture order count of the current picture and the picture order count of the first reference picture according to a formula POC_listY0=2*POC_Cur−POC_listX, where POC_Cur represents the picture order count of the current picture, POC_listX represents the picture order count of the first reference picture, and POC_listY represents the first picture order count. When the second reference picture list includes the first picture order count, a number of a reference picture represented by the first picture order count in the second reference picture list is determined as the index value of the second reference picture. When the second reference picture list does not include the first picture order count, a second picture order count is calculated based on the picture order count of the current picture and the picture order count of the first reference picture according to a formula (POC_Cur−POC_listX)*(POC_listY0'−POC_Cur)>0, where POC_listY0' represents the second picture order count. When the second reference picture list includes the second picture order count, a number of a reference picture represented by the second picture order count in the second reference picture list is determined as the index value of the second reference picture. When the second reference picture list does not include the second picture order count, a third picture order count is calculated based on the picture order count of the current picture and the picture order count of the first reference picture according to a formula POC_listX≠POC_listY0", where POC_listY0" represents the third picture order count; and a number of a reference picture represented by the third picture order count in the second reference picture list is determined as the index value of the second reference picture.

Optionally, in another possible implementation of this application, a method for "obtaining an index value of a second reference picture" is: parsing a bitstream to obtain the index value of the second reference picture.

It may be learned that there may be a plurality of methods for "obtaining an index value of a second reference picture" in this application. A specific method for obtaining the index value of the second reference picture needs to be determined based on actual requirements or be preset.

According to a ninth aspect, a bi-directional inter prediction apparatus is provided. The bi-directional inter prediction apparatus includes an obtaining unit and a determining unit.

Specifically, the obtaining unit is configured to: obtain indication information, where the indication information is used to indicate to determine second motion information based on first motion information, the first motion information is motion information of a current block in a first direction, and the second motion information is motion information of the current block in a second direction; and obtain the first motion information. The determining unit is configured to: determine the second motion information based on the first motion information obtained by the obtaining unit, and determine a prediction sample of the current block based on the first motion information and the second motion information.

Optionally, in a possible implementation of this application, the determining unit is specifically configured to: obtain an index value of a first reference picture in the first motion information, and determine a picture order count of the first reference picture based on the index value of the first reference picture and a first reference picture list, where the first reference picture is a reference picture of the current block in the first direction, and the index value of the first reference picture is a number of the first reference picture in the first reference picture list; obtain an index value of a second reference picture, and determine a picture order count of the second reference picture based on the index value of the second reference picture and a second reference picture list, where the second reference picture is a reference picture of the current block in the second direction, and the index value of the second reference picture is a number of the second reference picture in the second reference picture list; determine a first motion vector based on a first motion vector difference and a first motion vector predictor flag that are in the first motion information, where the first motion vector is a motion vector of the current block in the first direction; and determine a second motion vector in the second motion information according to the following formula:

$$mv\_lY = \frac{POC\_Cur - POC\_listY}{POC\_Cur - POC\_listX} \times mv\_lX.$$

Herein, mv_lY represents the second motion vector, POC_Cur represents a picture order count of a current picture, POC_listX represents the picture order count of the first reference picture, POC_listY represents the picture order count of the second reference picture, mv_lX represents the first motion vector, and the second motion vector is a motion vector of the current block in the second direction.

Optionally, in another possible implementation of this application, the determining unit is specifically configured to: obtain an index value of a first reference picture in the first motion information, and determine a picture order count of the first reference picture based on the index value of the first reference picture and a first reference picture list, where the first reference picture is a reference picture of the current block in the first direction, and the index value of the first reference picture is a number of the first reference picture in the first reference picture list; obtain an index value of a second reference picture, and determine a picture order count of the second reference picture based on the index value of the second reference picture and a second reference picture list, where the second reference picture is a reference picture of the current block in the second direction, and the index value of the second reference picture is a number of the second reference picture in the second reference picture list; determine a first motion vector based on a first motion vector difference and a first motion vector predictor flag that are in the first motion information, where the first motion vector is a motion vector of the current block in the first direction; and when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, determine a second motion vector in the second motion information according to a formula mv_lX=−mv_lX, where in this formula, mv_lY represents the second motion vector, mv_lX represents the first motion vector, and the second motion vector is a motion vector of the current block in the second direction.

Optionally, in another possible implementation of this application, the determining unit is specifically configured to determine a second motion vector in the second motion information according to a formula mv_lY=−mv_lX, where in this formula, mv_lY represents the second motion vector, mv_lX represents a first motion vector, and the second motion vector is a motion vector of the current block in the second direction.

Optionally, in another possible implementation of this application, the determining unit is specifically configured to: obtain an index value of a first reference picture and a first motion vector difference that are in the first motion information, and determine a picture order count of the first reference picture based on the index value of the first reference picture and a first reference picture list, where the first reference picture is a reference picture of the current block in the first direction, and the index value of the first reference picture is a number of the first reference picture in the first reference picture list; obtain an index value of a second reference picture, determine a picture order count of the second reference picture based on the index value of the second reference picture and a second reference picture list, and determine a second predicted motion vector based on the index value of the second reference picture and a second candidate predicted motion vector list, where the second predicted motion vector is a predicted motion vector of the current block in the second direction, the second reference picture is a reference picture of the current block in the second direction, and the index value of the second reference picture is a number of the second reference picture in the second reference picture list; determine a second motion vector difference in the second motion information according to the following formula:

$$mvd\_lY = \frac{POC\_Cur - POC\_listY}{POC\_Cur - POC\_listX} \times mvd\_lX,$$

where
  mvd_lY represents the second motion vector difference, POC_Cur represents a picture order count of a current picture, POC_listX represents the picture order count of the first reference picture, POC_listY represents the picture order count of the second reference picture, and mvd_lX represents the first motion vector difference; and determine a second motion vector based on the second predicted motion vector and the second motion vector difference, where the second motion vector is a motion vector of the current block in the second direction.

Optionally, in another possible implementation of this application, the determining unit is specifically configured to: obtain an index value of a first reference picture and a first motion vector that are in the first motion information, and determine a picture order count of the first reference picture based on the index value of the first reference picture and a first reference picture list, where the first reference picture is a reference picture of the current block in the first direction, and the index value of the first reference picture is a number of the first reference picture in the first reference picture list; obtain an index value of a second reference picture, determine a picture order count of the second reference picture based on the index value of the second reference picture and a second reference picture list, and determine a second predicted motion vector based on the index value of the second reference picture and a second candidate predicted motion vector list, where the second predicted motion vector is a predicted motion vector of the current block in the second direction, the second reference picture is a reference picture of the current block in the second direction, and the index value of the second reference picture is a number of the second reference picture in the second reference picture list; when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, determine a second motion vector difference in the second motion information according to a formula mvd_lY=−mvd_lX, where mvd_lY represents the second motion vector difference, and mvd_lX represents a first motion vector difference; and determine a second motion vector based on the second predicted motion vector and the second motion vector difference, where the second motion vector is a motion vector of the current block in the second direction.

Optionally, in another possible implementation of this application, the determining unit is specifically configured to: determine a second motion vector difference in the second motion information according to a formula mvd_lY=−mvd_lX, where in this formula, mvd_lY represents the second motion vector difference, and mvd_lX represents a first motion vector difference; and determine a second motion vector based on a second predicted motion vector and the second motion vector difference, where the second motion vector is a motion vector of the current block in the second direction.

Optionally, in another possible implementation of this application, the obtaining unit is specifically configured to: calculate a first picture order count based on the picture order count of the current picture and the picture order count of the first reference picture according to a formula. POC_listY0=2*POC_Cur POC_listX, where POC_Cur represents the picture order count of the current picture, POC_listX represents the picture order count of the first reference picture, and POC_listY represents the first picture order count; and when the second reference picture list includes the first picture order count, determine, as the index value of the second reference picture, a number of a reference picture represented by the first picture order count in the second reference picture list.

Optionally, in another possible implementation of this application, the obtaining unit is specifically configured to: calculate a second picture order count based on the picture order count of the current picture and the picture order count of the first reference picture according to a formula (POC_Cur−POC_listX)*(POC_listY0'−POC_Cur)>0, where POC_listY0' represents the second picture order count; and when the second reference picture list includes the second picture order count, determine, as the index value of the second reference picture, a number of a reference picture represented by the second picture order count in the second reference picture list.

Optionally, in another possible implementation of this application, the obtaining unit is specifically configured to: calculate a third picture order count based on the picture order count of the current picture and the picture order count of the first reference picture according to a formula POC_listX≠POC_listY0", where POC_listY0" represents the third picture order count; and determine, as the index value of the second reference picture, a number of a reference picture represented by the third picture order count in the second reference picture list.

According to a tenth aspect, a bi-directional inter prediction method is provided. There are a plurality of implementations for the bi-directional inter prediction method.

An implementation includes: parsing a bitstream to obtain a first identifier, where the first identifier is used to indicate whether to determine second motion information based on first motion information, the first motion information is motion information of a current block in a first direction, and the second motion information is motion information of the current block in a second direction; if a value of the first identifier is a first preset value, obtaining the first motion information, and determining the second motion information based on the first motion information; and determining a prediction sample of the current block based on the first motion information and the second motion information.

Another implementation includes: parsing a bitstream to obtain a second identifier, where the second identifier is used to indicate whether to calculate motion information of a current block by using a motion information derivation algorithm; if a value of the second identifier is a second preset value, obtaining a third identifier, where the third identifier is used to indicate whether to determine second motion information based on first motion information, the first motion information is motion information of the current block in a first direction, and the second motion information is motion information of the current block in a second direction; if a value of the third identifier is a third preset value, obtaining the first motion information, and determining the second motion information based on the first motion information; and determining a prediction sample of the current block based on the first motion information and the second motion information.

Another implementation includes: parsing a bitstream to obtain a second identifier, where the second identifier is used to indicate whether to calculate motion information of a current block by using a motion information derivation algorithm if a value of the second identifier is a second preset value, obtaining first motion information, and determining second motion information based on the first motion information, where the first motion information is motion information of the current block in a first direction, and the second motion information is motion information of the current block in a second direction; and determining a prediction sample of the current block based on the first motion information and the second motion information.

Another implementation includes: parsing a bitstream to obtain a fourth identifier, where the fourth identifier is used to indicate whether to calculate motion information of a current block by using a motion information derivation algorithm; if a value of the fourth identifier is a fourth preset value, determining an index value of a first reference picture and an index value of a second reference picture based on a first reference picture list and a second reference picture list, where the first reference picture list is a reference picture list of the current block in a first direction, the second reference picture list is a reference picture list of the current block in a second direction, the first reference picture is a reference picture of the current block in the first direction, and the second reference picture is a reference picture of the current block in the second direction; obtaining a first motion vector difference and a first motion vector predictor flag, and determining second motion information based on first motion information, where the first motion information includes the index value of the first reference picture, the first motion vector difference, and the first motion vector predictor flag, and the second motion information is motion information of the current block in the second direction; and determining a prediction sample of the current block based on the first motion information and the second motion information.

Another implementation includes: parsing a bitstream to obtain a first identifier, where the first identifier is used to indicate whether to determine second motion information based on first motion information, the first motion information is motion information of a current block in a first direction, and the second motion information is motion information of the current block in a second direction; if a value of the first identifier is an eighth preset value, obtaining a fifth identifier, where the fifth identifier is used to indicate whether to determine the first motion information based on the second motion information; if a value of the fifth identifier is a fifth preset value, obtaining the second motion information, and determining the first motion information based on the second motion information; and determining a prediction sample of the current block based on the first motion information and the second motion information.

Another implementation includes: parsing a bitstream to obtain a second identifier, where the second identifier is used to indicate whether to calculate motion information of a current block by using a motion information derivation algorithm if a value of the second identifier is a second preset value, obtaining a third identifier, where the third identifier is used to indicate whether to determine second motion information based on first motion information, the first motion information is motion information of the current block in a first direction, and the second motion information is motion information of the current block in a second direction; if a value of the third identifier is a sixth preset value, obtaining the second motion information, and determining the first motion information based on the second motion information; and determining a prediction sample of the current block based on the first motion information and the second motion information.

For specific descriptions of the first identifier to the fourth identifier refer to the following descriptions.

In the bi-directional inter prediction method provided in this application, after an identifier is obtained by parsing the bitstream, whether to determine the second motion information based on the first motion information is determined based on a value of the identifier. After it is determined that the second motion information needs to be determined based on the first motion information, the first motion information is obtained, and then the second motion information is determined based on the obtained first motion information. In this way, the bitstream needs to include only the corresponding identifier and the first motion information, and no longer needs to include the second motion information. Compared with the prior art in which a bitstream includes motion information of each picture block in each direction the bi-directional inter prediction method provided in this application effectively reduces motion information included in the bitstream, and improves effective utilization of transmission resources, a transmission rate, and a coding rate.

According to an eleventh aspect, a bi-directional inter prediction apparatus is provided. The bi-directional inter prediction apparatus includes an obtaining unit and a determining unit.

Specifically, in an implementation, the obtaining unit is configured to: parse a bitstream to obtain a first identifier, where the first identifier is used to indicate whether to determine second motion information based on first motion information, the first motion information is motion information of a current block in a first direction, and the second motion information is motion information of the current block in a second direction; and if a value of the first identifier is a first preset value, obtain the first motion information. The determining unit is configured to: determine the second motion information based on the first motion information obtained by the obtaining unit, and determine a prediction sample of the current block based on the first motion information and the second motion information.

In another implementation, the obtaining unit is configured to: parse a bitstream to obtain a second identifier, where the second identifier is used to indicate whether to calculate motion information of a current block by using a motion information derivation algorithm; if a value of the second identifier is a second preset value, obtain a third identifier, where the third identifier is used to indicate whether to determine second motion information based on first motion information, the first motion information is motion information of the current block in a first direction, and the second motion information is motion information of the current block in a second direction; and if a value of the third identifier is a third preset value, obtain the first motion information. The determining unit is configured to: determine the second motion information based on the first motion information obtained by the obtaining unit, and determine a prediction sample of the current block based on the first motion information and the second motion information.

In another implementation, the obtaining unit is configured to: parse a bitstream to obtain a second identifier, where the second identifier is used to indicate whether to calculate motion information of a current block by using a motion information derivation algorithm; and if a value of the second identifier is a second preset value, obtain first motion information. The determining unit is configured to: determine second motion information based on the first motion information obtained by the obtaining unit, where the first motion information is motion information of the current block in a first direction, and the second motion information is motion information of the current block in a second direction; and determine a prediction sample of the current block based on the first motion information and the second motion information.

In another implementation, the obtaining unit is configured to parse a bitstream to obtain a fourth identifier, where the fourth identifier is used to indicate whether to calculate motion information of a current block by using a motion information derivation algorithm. The determining unit is configured to: if a value of the fourth identifier obtained by the obtaining unit is a fourth preset value, determine an index value of a first reference picture and an index value of a second reference picture based on a first reference picture list and a second reference picture list, where the first reference picture list is a reference picture list of the current block in a first direction, the second reference picture list is a reference picture list of the current block in a second direction, the first reference picture is a reference picture of the current block in the first direction, and the second reference picture is a reference picture of the current block in the second direction. The obtaining unit is further configured to obtain a first motion vector difference and a first motion vector predictor flag. The determining unit is further configured to: determine second motion information based on first motion information, where the first motion information includes the index value of the first reference picture, the first motion vector difference, and the first motion vector predictor flag, and the second motion information is motion information of the current block in the second direction; and determine a prediction sample of the current block based on the first motion information and the second motion information.

According to a twelfth aspect, a terminal is provided. The terminal includes one or more processors, a memory, and a communications interface. The memory and the communications interface are coupled to the one or more processors. The memory is configured to store computer program code, and the computer program code includes an instruction. When the one or more processors execute the instruction, the terminal performs the method (or the method corresponding to the apparatus) according to any one of the foregoing aspects and the possible implementations of the foregoing aspects.

According to a thirteenth aspect, a video decoder is provided, including a non-volatile storage medium and a central processing unit. The non-volatile storage medium stores an executable program. The central processing unit is connected to the non-volatile storage medium, and executes the executable program to implement the method (or the method corresponding to the apparatus) according to any one of the foregoing aspects and the possible implementations of the foregoing aspects.

According to a fourteenth aspect, a decoder is provided. The decoder includes a bi-directional inter prediction apparatus and a reconstruction module. The reconstruction module is configured to determine a reconstructed sample value of a current block based on a prediction sample obtained by the bi-directional inter prediction apparatus. The bi-directional inter prediction apparatus may implement the method (or the method corresponding to the apparatus) according to any one of the foregoing aspects and the possible implementations of the foregoing aspects.

According to a fifteenth aspect, an encoder is provided, and can implement the method (or the method corresponding to the apparatus) according to any one of the foregoing aspects and the possible implementations of the foregoing aspects that corresponds to or is coupled to the foregoing decoder.

According to a sixteenth aspect, a computer-readable storage medium is provided. The computer-readable storage medium stores an instruction, and when the instruction is run on the foregoing terminal, the terminal is enabled to perform the method (or the method corresponding to the apparatus) according to any one of the foregoing aspects and the possible implementations of the foregoing aspects.

According to a seventeenth aspect, a computer program product including an instruction is provided. When the computer program product is run on the foregoing terminal, the terminal is enabled to perform the bi-directional inter prediction method according to any one of the foregoing aspects and the possible implementations of the foregoing aspects.

In this application, a name of the bi-directional inter prediction apparatus imposes no limitation on devices or function modules. In actual implementation, the devices or the function modules may have other names. Provided that functions of the devices or the function modules are similar to those in this application, the devices or the function modules fall within the scope of the claims in this application and their equivalent technologies.

In specific descriptions of the first aspect to the sixteenth aspect and various implementations of the first aspect to the sixteenth aspect in this application, free combination may be implemented without violating a natural law. In addition, some expressions and effects may also be universal in different solutions. Details are not described herein.

These aspects or other aspects in this application are more concise and comprehensible in the following descriptions.

DESCRIPTION OF EMBODIMENTS

Figure 1:
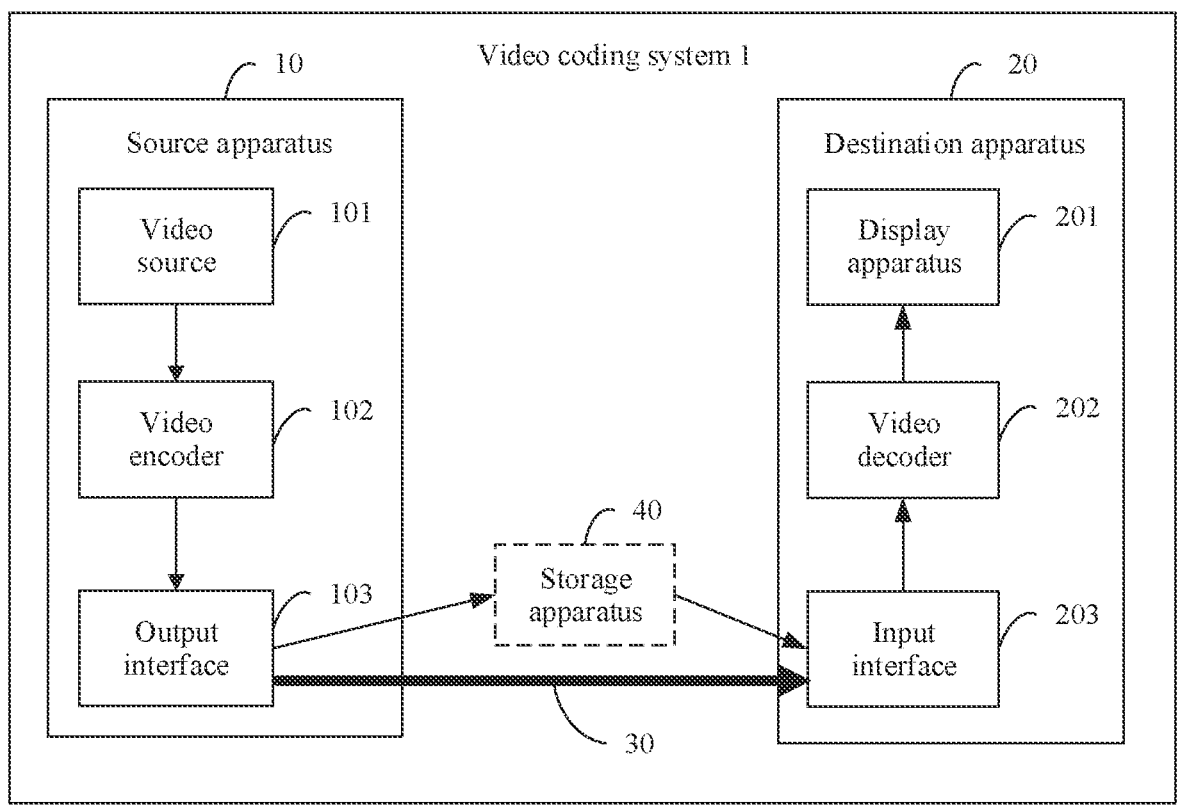
FIG. 1 is a schematic structural diagram of a video coding system according to an embodiment of this application.

In the specification, claims, and accompanying drawings of this application, terms such as "first", "second", "third", and "fourth" are intended to distinguish between different objects but do not indicate a particular order.

In the embodiments of this application, the word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

To facilitate understanding of the embodiments of this application, related elements in the embodiments of this application are first described herein.

Picture encoding (picture encoding): a process of compressing a picture sequence into a bitstream.

Picture decoding (picture decoding): a process of restoring a bitstream to a reconstructed picture according to a specific syntax rule and a specific processing method.

Currently, a video picture encoding process is as follows: An encoder side first partitions an original picture into a plurality of parts that do not overlap, and each part may be used as a picture block. Then, the encoder side performs operations such as prediction (Prediction), transform (Transform), and quantization (Quantization) on each picture block, to obtain a bitstream corresponding to the picture block. The prediction is to obtain a prediction block of the picture block, so that only a difference (or referred to as a residual or a residual block) between the picture block and the prediction block of the picture block may be encoded and transmitted, thereby reducing transmission overheads. Finally, the encoder side sends the bitstream corresponding to the picture block to a decoder side.

Correspondingly, after receiving the bitstream, the decoder side performs a video decoding process. Specifically, the decoder side performs operations such as prediction, inverse quantization, and inverse transform on the received bitstream to obtain a reconstructed picture block (or referred to as a picture block after reconstruction). This process is referred to as a picture reconstruction process (or a picture rebuilding process). Then, the decoder side assembles reconstructed blocks of all picture blocks in the original picture to obtain a reconstructed picture of the original picture, and plays the reconstructed picture.

An existing video picture coding technology includes intra prediction and inter prediction. Inter prediction is prediction completed by coding picture block/decoding picture block by using a correlation between a current picture and a reference picture of the current picture. The current picture may have one or more reference pictures. Specifically, a prediction picture block of a current block is generated based on a sample in a reference picture of the current block.

Usually, the prediction picture block of the current block may be generated based on only one reference picture block, or the prediction picture block of the current block may be generated based on at least two reference picture blocks. Generating the prediction picture block of the current block based on one reference picture block is referred to as unidirectional prediction, and generating the prediction picture block of the current block based on at least two reference picture blocks is referred to as bi-directional inter prediction. The at least two reference picture blocks in bi-directional inter prediction may be from a same reference picture or different reference pictures. In other words, a "direction" in this application is a generalized definition. One direction in this application corresponds to one reference picture block. The following first direction and second direction correspond to different reference picture blocks. The two reference picture blocks may be included in a forward reference picture/backward reference picture of the current block; or one reference picture block may be included in a forward reference picture of the current block, and the other reference picture block may be included in a backward reference picture of the current block. Therefore, it may be understood that the first direction and the second direction correspond to different reference blocks, further correspond to different reference pictures, and further correspond to different reference picture lists (for example, L0 and/or L1). Both the first direction and the second direction may be forward directions or backward directions, or the first direction and the second direction may be respectively a forward direction and a backward direction or respectively a backward direction and a forward direction.

Optionally, bi-directional inter prediction may be inter prediction performed by using a correlation between a current video picture and a video picture that is encoded and played before the current video picture and a correlation between the current video picture and a video picture that is encoded before the current video picture and played after the current video picture.

It can be learned that bi-directional inter prediction includes inter prediction in two directions that is usually referred to as forward inter prediction and backward inter prediction. Forward inter prediction may be inter prediction performed by using the correlation between the current video picture and the video picture that is encoded and played before the current video picture. Backward inter prediction may be inter prediction performed by using the correlation between the current video picture and the video picture that is encoded before the current video picture and played after the current video picture.

Forward inter prediction corresponds to a forward reference picture list such as L0 (or L1), and backward inter prediction corresponds to a backward reference picture list such as L1 (or L0). The two reference picture lists may include a same quantity of reference pictures or different quantities of reference pictures.

Motion compensation (Motion Compensation, MC) is a process of predicting a current block by using a reference picture block.

In most coding frameworks, a video sequence includes a series of pictures (picture), a picture is partitioned into at least one slice (slice), and each slice is further partitioned into picture blocks (block). Video encoding/decoding is performed by picture block. Encoding/decoding may be performed from left to right and from top to bottom row by row from a top-left location of the picture. Herein, the picture block may be a macroblock (macroblock, MB) in the video coding standard H.264, or may be a coding unit (Coding Unit, CU) in the high efficiency video coding (High Efficiency Video Coding, HEVC) standard. This is not specifically limited in the embodiments of this application.

In this application, a picture block that is being encoded/decoded is referred to as a current picture block or a current block (current block), and a picture in which the current block is located is referred to as a current picture.

Usually, the current picture may be a unidirectional prediction picture (P picture), or may be a bi-directional prediction picture (B picture). When the current picture is the P picture, the current picture has one reference picture list. When the current picture is the B picture, the current picture has two reference picture lists, and the two lists are usually referred to as L0 and L1. Each reference picture list includes at least one reference picture used to reconstruct the current picture. The reference picture is used to provide a reference sample for inter prediction on the current picture.

In the current picture, a neighboring picture block (for example, on the left, top, or right side of the current block) of the current block may have been encoded/decoded, and a reconstructed picture is obtained. The neighboring picture block is referred to as a reconstructed picture block. Information such as a coding mode and a reconstructed sample of the reconstructed picture block is available (available).

A picture that has been encoded/decoded before the current picture is encoded/decoded is referred to as a reconstructed picture.

A motion vector (Motion Vector, MV) is an important parameter in an inter prediction process, and represents a spatial displacement of the encoded picture block relative to the current block. Usually, a motion estimation (Motion Estimation, ME) method, such as motion search, may be used to obtain the motion vector. In a preliminary inter prediction technology, an encoder side transmits a motion vector of a current block in a bitstream, so that a decoder side reproduces a prediction sample of the current block, to obtain a reconstructed block. To further improve encoding efficiency, it is further proposed to differentially encode a motion vector by using a reference motion vector, that is, encode only a motion vector difference (Motion Vector Difference, MVD).

To enable the decoder side and the encoder side to use a same reference picture block, the encoder side needs to send motion information of each picture block to the decoder side through a bitstream. If the encoder side directly encodes a motion vector of each picture block, a large quantity of transmission resources are consumed. Because motion vectors of spatially neighboring picture blocks are strongly correlated, the motion vector of the current block can be predicted based on a motion vector of a neighboring encoded picture block. A motion vector obtained through prediction is referred to as an MVP, and a difference between the motion vector of the current block and the MVP is referred to as an MVD.

In the video coding standard H.264, multi-reference picture prediction is used in a motion estimation process to improve prediction accuracy. To be specific, a buffer storing a plurality of reconstructed pictures is created, and all the reconstructed pictures in the buffer are searched for an optimal reference picture block for motion compensation, to better remove temporal redundancy. In the video coding standard H.264, two buffers are used in inter prediction: a reference picture list 0 (reference list 0/L0) and a reference picture list 1 (reference list 1/L1). A reference picture in which an optimal reference block in each list is located is marked by an index value, that is, ref_idx_l0 or ref_idx_l1. In each reference picture list, motion information of a reference picture block includes a reference picture index value (ref_idx_l0 or ref_idx_l1), an MVP flag (or an MVP), and an MVD. The decoder side may find a correct reference picture block in a selected reference picture based on the reference picture index value, the MVP flag, and the MVD. It should be understood that, in specific application, the reference picture index value, the MVP flag (or the MVP), and/or the MVD may also be collectively referred to as motion information by a person skilled in the art. Therefore, a specific meaning of the motion information needs to be interpreted and explained with reference to a specific application scenario, and should not constitute a limitation on concept understanding.

Currently, inter prediction modes frequently used in the HEVC standard are an advanced motion vector prediction (Advanced Motion Vector Prediction, AMVP) mode, a merge (Merge) mode, and a non-translational motion model prediction mode.

In the AMVP mode, the encoder side constructs a candidate motion vector list by using motion information of an encoded picture block that is spatially or temporally adjacent to the current block, and determines an optimal motion vector in the candidate motion vector list as the MVP of the current block based on rate-distortion costs. In addition, the encoder side performs motion search in a neighborhood centered on the MVP to obtain the motion vector of the current block. The encoder side transmits an index value (namely, the MVP flag) of the MVP in the candidate motion vector list, the reference picture index value, and the MVD to the decoder side.

In the merge mode, the encoder side constructs a candidate motion information list by using motion information of an encoded picture block that is spatially or temporally adjacent to the current block, and determines optimal motion information in the candidate motion information list as motion information of the current block based on rate-distortion costs. The encoder side transmits an index value of a location of the optimal motion information in the candidate motion information list to the decoder side.

In the non-translational motion model prediction mode, the encoder side and the decoder side derive motion information of all subblocks of the current block by using a same motion model, and perform motion compensation based on the motion information of all the subblocks to obtain a prediction picture block. This improves prediction efficiency. A motion model frequently used by the encoder side and the decoder side is a 4-parameter affine model, a 6-parameter affine transform model, or an 8-parameter bilinear model.

For example, the 4-parameter affine transform model may be represented by using motion vectors of two samples and coordinates of the two samples relative to a sample at the top-left corner of the current block. Herein, a sample used to represent a motion model parameter is referred to as a control point. If the sample at the top-left corner (0, 0) of the current block and a sample at the top-right corner (W, 0) of the current block are control points, and motion vectors of the top-left corner and the top-right corner of the current block are respectively $(vx_0, vy_0)$ and $(vx_1, vy_1)$, motion information of each subblock of the current block is obtained according to the following formula (1). In the following formula (1), (x, y) is coordinates of the subblock relative to the sample at the top-left corner of the current block, (vx, vy) is a motion vector of the subblock, and W is the width of the current block.

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (1)$$

For example, the 6-parameter affine transform model may be represented by using motion vectors of three samples and coordinates of the three samples relative to a sample at the top-left corner of the current block. If the sample at the top-left corner (0, 0) of the current block, a sample at the top-right corner (W, 0) of the current block, and a sample at the bottom-left corner (0, H) of the current block are control points, and motion vectors of the top-left corner, the top-right corner, and the bottom-left corner of the current block are respectively $(vx_0, vy_0)$, $(vx_1, vy_1)$, and $(vx_2, vy_2)$, motion information of each subblock of the current block is obtained according to the following formula (2). In the following formula (2), (x, y) is coordinates of the subblock relative to the sample at the top-left corner of the current block, (vx, vy) is a motion vector of the subblock, and W and H are respectively the width and the height of the current block.

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_1 - vx_0}{H}y + vy_0 \end{cases} \quad (2)$$

For example, the 8-parameter bilinear model may be represented by using motion vectors of four samples and coordinates of the four samples relative to a sample at the top-left corner of the current block. If the sample at the top-left corner (0, 0) of the current block, a sample at the top-right corner (W, 0) of the current block, a sample at the bottom-left corner (0, H) of the current block, and a sample at the bottom-right corner (W, H) of the current block are control points, and motion vectors of the top-left corner, the top-right corner, the bottom-left corner, and the bottom-right corner of the current block are respectively ($vx_0$, $vy_0$), ($vx_1$, $vy_1$), ($vx_2$, $vy_2$), and ($vx_3$, $vy_3$), motion information of each subblock of the current block is obtained according to the following formula (3). In the following formula (3), (x, y) is coordinates of the subblock relative to the sample at the top-left corner of the current block, (vx, vy) is a motion vector of the subblock, and W and H are respectively the width and the height of the current block, $$\begin{cases} v_x = \dfrac{v_{1x} - v_{0x}}{W}x + \dfrac{v_{2x} - v_{0x}}{H}y + \dfrac{v_{3x} + v_{0x} - v_{1x} - v_{2x}}{WH}xy + v_{0x} \\ v_y = \dfrac{v_{1y} - v_{0y}}{W}x + \dfrac{v_{2y} - v_{0y}}{H}y + \dfrac{v_{3y} + v_{0y} - v_{1y} - v_{2y}}{WH}xy + v_{0y} \end{cases} \quad (3)$$

It can be easily learned that, in any one of the foregoing inter prediction modes, if inter prediction is bi-directional inter prediction, the encoder side needs to send motion information of each picture block in each direction to the decoder side. Consequently, the motion information occupies a relatively large quantity of transmission resources. This reduces effective utilization of transmission resources, a transmission rate, and coding compression efficiency.

To resolve the foregoing problem, this application provides a bi-directional inter prediction method. In bi-directional inter prediction, an encoder side sends motion information of a current block in a first direction to a decoder side, and after receiving the motion information of the current block in the first direction, the decoder side calculates motion information of the current block in a second direction based on the motion information of the current block in the first direction. In this way, a prediction sample of the current block may be calculated based on the motion information of the current block in the first direction and the motion information of the current block in the second direction.

The bi-directional inter prediction method provided in this application may be performed by a bi-directional inter prediction apparatus, a video coding apparatus, a video codec, or another device having a video coding function.

The bi-directional inter prediction method provided in this application is applicable to a video coding system. In the video coding system, a video encoder and a video decoder are configured to calculate motion information of a current block according to examples of the bi-directional inter prediction method provided in this application. Specifically, motion information of the current block in a second direction may be calculated based on motion information of the current block in a first direction, so that a prediction sample of the current block is determined based on the motion information of the current block in the first direction and the motion information of the current block in the second direction. In this way, only the motion information of the current block in the first direction needs to be transmitted between the video encoder and the video encoder. This effectively improves transmission resource utilization and coding compression efficiency.

FIG. 1 shows a structure of a video coding system. As shown in FIG. 1, the video coding system 1 includes a source apparatus 10 and a destination apparatus 20. The source apparatus 10 generates encoded video data. The source apparatus 10 may also be referred to as a video encoding apparatus or a video encoding device. The destination apparatus 20 may decode the encoded video data generated by the source apparatus 10. The destination apparatus 20 may also be referred to as a video decoding apparatus or a video decoding device. The source apparatus 10 and/or the destination apparatus 20 may include at least one processor and a memory coupled to the at least one processor. The memory may include but is not limited to a read-only memory (Read-Only Memory, ROM), a random access memory (Random Access Memory, RAM), an electrically erasable programmable read-only memory (Electrically Erasable Programmable Read-Only Memory, EEPROM), a flash memory, or any other medium that may be configured to store required program code in a form of an instruction or a data structure that can be accessed by a computer. This is not specifically limited in this application.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and similar apparatuses.

The destination apparatus 20 may receive the encoded video data from the source apparatus 10 through a link 30. The link 30 may include one or more media and/or apparatuses that can transfer the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit the modulated video data to the destination apparatus 20. The one or more communications media may include a wireless and/or wired communications medium, for example, a radio frequency (Radio Frequency, RE) spectrum or one or more physical transmission lines. The one or more communications media may be a part of a packet-based network (such as a local area network, a wide area network, or a global network (for example, the internet)). The one or more communications media may include a router, a switch, a base station, or another device implementing communication between the source apparatus 10 and the destination apparatus 20.

In another example, the encoded video data may be output to a storage apparatus 40 through an output interface 103. Similarly, the encoded video data may be accessed from the storage apparatus 40 through an input interface 203. The storage apparatus 40 may include a plurality of types of locally accessible data storage media such as a Blu-ray disc, a high-density digital video disc (Digital Video Disc, DVD), a compact disc read-only memory (Compact Disc Read- Only Memory, CD-ROM), a flash memory, or another suitable digital storage medium configured to store the encoded video data.

In another example, the storage apparatus 40 may correspond to a file server or another intermediate storage apparatus that stores the encoded video data generated by the source apparatus 10. In this example, the destination apparatus 20 may obtain the stored video data from the storage apparatus 40 through streaming transmission or downloading. The file server may be any type of server that can store the encoded video data and transmit the encoded video data to the destination apparatus 20. For example, the file server may include a world wide web (World Wide Web. WWW) server (for example, used for a website), a file transfer protocol (File Transfer Protocol, FTP) server, a network attached storage (Network Attached. Storage, NAS) apparatus, or a local disk drive.

The destination apparatus 20 may access the encoded video data through any standard data connection (for example, an internet connection). An example type of the data connection includes a wireless channel or a wired connection (for example, a cable modem) that can be used to access the encoded video data stored in the file server, or a combination thereof. Transmission of the encoded video data from the file server may be streaming transmission, download transmission, or a combination thereof.

The bi-directional inter prediction method in this application is not limited to a wireless application scenario. For example, the bi-directional inter prediction method in this application may be used in video coding for supporting a plurality of multimedia applications such as the following applications: over-the-air television broadcasting, cable television transmission, satellite television transmission, streaming video transmission (for example, through the internet), encoding of video data stored in a data storage medium, decoding of video data stored in a data storage medium, or another application. In some examples, the video coding system 1 may be configured to support unidirectional or bi-directional video transmission, to support applications such as streaming video transmission, video playing, video broadcasting, and/or videotelephony.

It should be noted that the video coding system 1 shown in FIG. 1 is merely an example of the video coding system, and does not limit the video coding system in this application. The bi-directional inter prediction method provided in this application is further applicable to a scenario in which there is no data communication between an encoding apparatus and a decoding apparatus. In other examples, to-be-encoded video data or the encoded video data may be retrieved from a local memory, may be transmitted in a streaming manner on a network, or the like. The video encoding apparatus may encode the to-be-encoded video data and store the encoded video data in the memory. The video decoding apparatus may obtain the encoded video data from the memory and decode the encoded video data.

In FIG. 1, the source apparatus 10 includes a video source 101, a video encoder 102, and the output interface 103. In some examples, the output interface 103 may include a modulator/demodulator (modem) and/or a transmitter. The video source 101 may include a video capturing apparatus (for example, a camera), a video archive including previously captured video data, a video input interface for receiving video data from a video content provider, and/or a computer graphics system for generating video data, or a combination of the foregoing video data sources.

The video encoder 102 may encode video data that is from the video source 101. In some examples, the source apparatus 10 directly transmits the encoded video data to the destination apparatus 20 through the output interface 103. In other examples, the encoded video data may alternatively be stored in the storage apparatus 40, so that the destination apparatus 20 subsequently accesses the encoded video data for decoding and/or playing.

In an example in FIG. 1, the destination apparatus 20 includes a display apparatus 201, a video decoder 202, and the input interface 203. In some examples, the input interface 203 includes a receiver and/or a modem. The input interface 203 may receive the encoded video data through the link 30 and/or from the storage apparatus 40. The display apparatus 201 may be integrated with the destination apparatus 20 or may be disposed outside the destination apparatus 20. Usually, the display apparatus 201 displays decoded video data. The display apparatus 201 may include a plurality of types of display apparatuses, for example, a liquid crystal display, a plasma display, an organic light-emitting diode display, or a display apparatus of another type.

Optionally, the video encoder 102 and the video decoder 202 may be respectively integrated with an audio encoder and an audio decoder, and may include an appropriate multiplexer-demultiplexer unit or other hardware and software, to encode both audio and a video in a combined data stream or a separate data stream.

The video encoder 102 and the video decoder 202 may include at least one microprocessor, a digital signal processor (Digital Signal Processor, DSP), an application-specific integrated circuit (Application-Specific Integrated Circuit, ASIC), a field programmable gate array (Field Programmable Gate Array, FPGA), discrete logic, hardware, or any combination thereof. If the bi-directional inter prediction method provided in this application is implemented by using software, an instruction used for the software may be stored in an appropriate non-volatile computer-readable storage medium, and at least one processor may be used to execute the instruction in the hardware to implement this application. Any one of the foregoing content (including the hardware, the software, a combination of the hardware and the software, and the like) may be considered as the at least one processor. The video encoder 102 may be included in an encoder, the video decoder 202 may be included in a decoder, and the encoder or the decoder may be a part of a combined encoder/decoder (cod cc) in a corresponding apparatus.

The video encoder 102 and the video decoder 202 in this application may perform operations according to a video compression standard (for example, HEVC or VVC), or may perform operations according to another industry standard. This is not specifically limited in this application.

The video encoder 102 is configured to: perform bi-directional motion estimation on a current block, to determine motion information of the current block in a first direction, and calculate motion information of the current block in a second direction based on the motion information of the current block in the first direction. In this way, the video encoder 102 determines a prediction picture block of the current block based on the motion information of the current block in the first direction and the motion information of the current block in the second direction. Further, the video encoder 102 performs operations such as transform and quantization on a residual between the current block and the prediction picture block of the current block to generate a bitstream, and sends the bitstream to the video decoder 202. The bitstream includes the motion information of the current block in the first direction and indication information that is used to indicate to determine the second motion information based on the first motion information. The indication information may be represented by using different identifiers. For a method for representing the indication information, refer to descriptions in subsequent examples.

Optionally, a method in which "the video encoder 102 calculates the motion information of the current block in the second direction based on the motion information of the current block in the first direction" may be as follows: The video encoder 102 determines a motion vector of the current block in the second direction based on a motion vector of the current block in the first direction; or the video encoder 102 determines a motion vector difference of the current block in the second direction based on a motion vector difference of the current block in the first direction, and determines a motion vector of the current block in the second direction based on the motion vector difference of the current block in the second direction and a predicted motion vector of the current block in the second direction.

Figure 4:
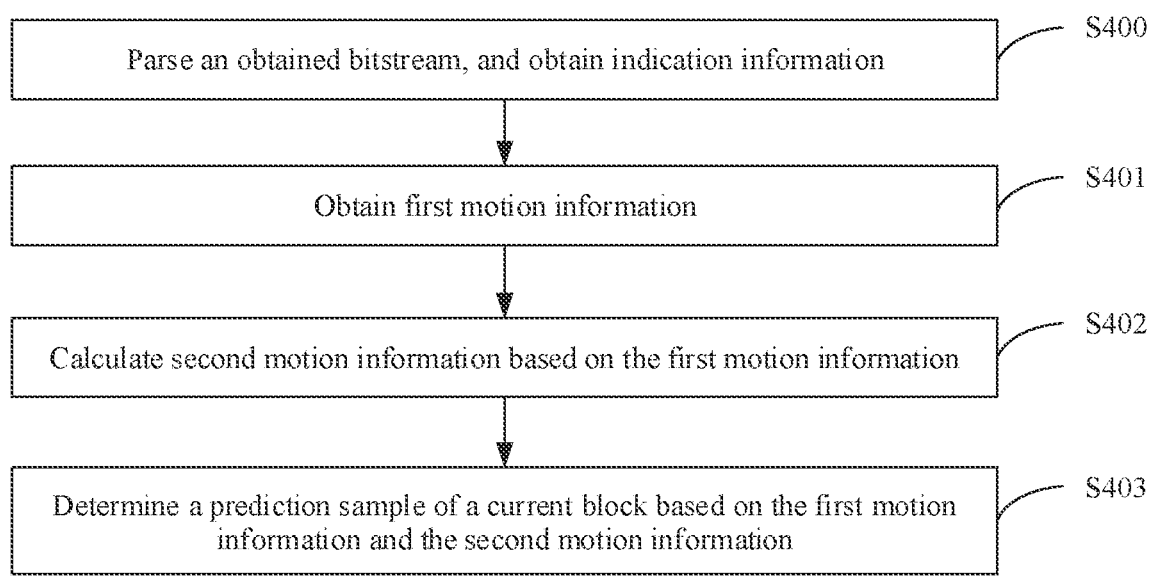
FIG. 4 is a schematic flowchart of a bi-directional inter prediction method according to an embodiment of this application.

Referring to FIG. 4 below, the video decoder 202 may be configured to perform the following steps:

S400: Obtain a bitstream, and parse the bitstream, to obtain indication information used to indicate to determine second motion information based on first motion information, that is, determine to derive and calculate motion information in one direction based on motion information in another direction, where the first motion information includes motion information of a current block in a first direction, the second motion information includes motion information of the current block in a second direction, and the first direction is different from the second direction.

S401: Obtain the first motion information.

S402: Determine the second motion information based on the obtained first motion information.

S403: The video decoder 202 determines a prediction sample of the current block based on the first motion information and the second motion information.

A method in which "the video decoder 202 calculates the motion information of the current block in the second direction based on the motion information of the current block in the first direction" may be as follows: The video decoder 202 determines a motion vector of the current block in the second direction based on a motion vector of the current block in the first direction; or the video decoder 202 determines a motion vector difference of the current block in the second direction based on a motion vector difference of the current block in the first direction, and determines a motion vector of the current block in the second direction based on the motion vector difference of the current block in the second direction and a predicted motion vector of the current block in the second direction.

Figure 2:
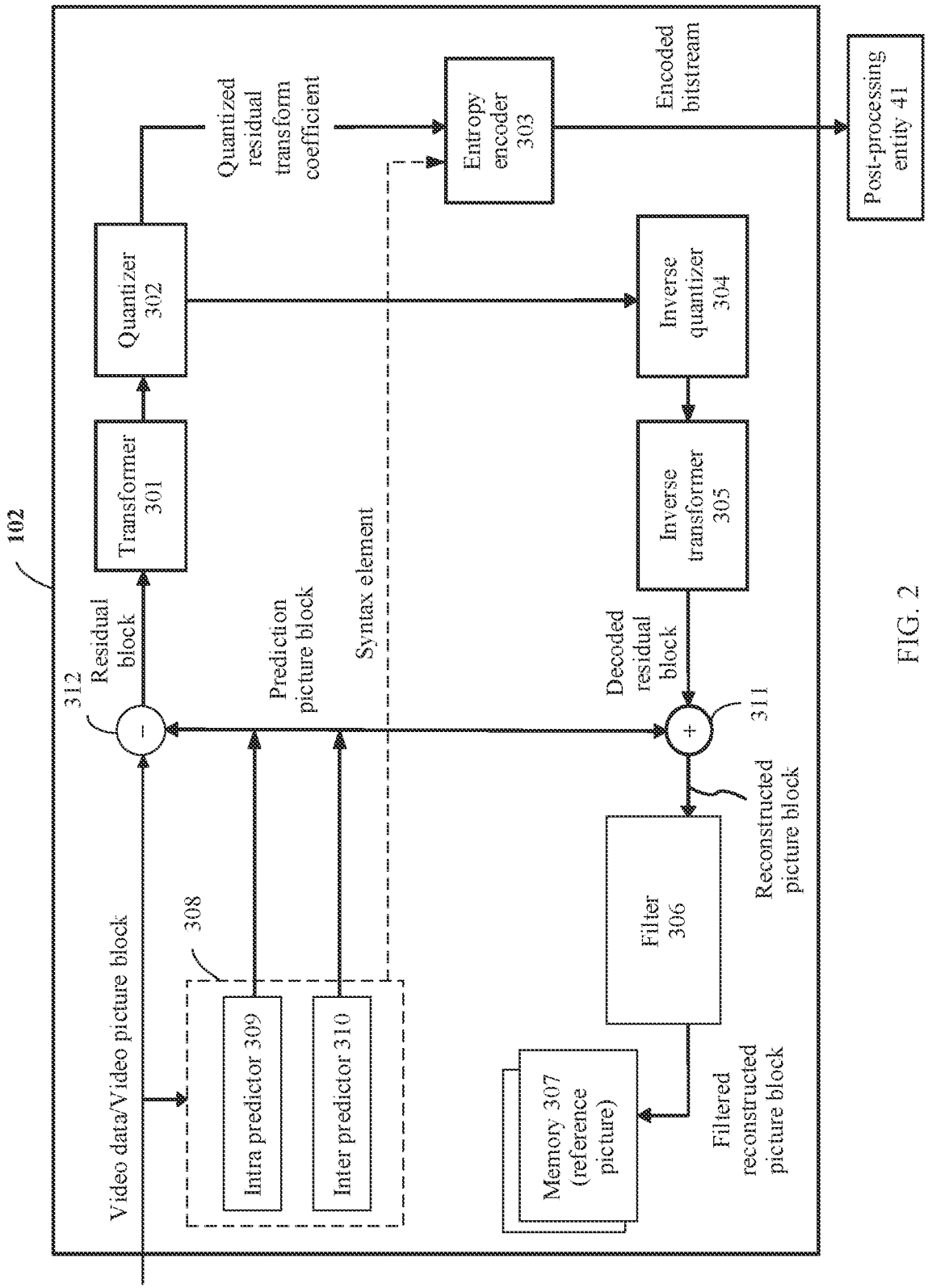
FIG. 2 is a schematic structural diagram of a video encoder according to an embodiment of this application.

FIG. 2 is a schematic structural diagram of the video encoder 102 according to an embodiment of this application. As shown in FIG. 2, the video encoder 102 is configured to output a video to a post-processing entity 41. The post-processing entity 41 represents an example of a video entity capable of processing encoded video data that is from the video encoder 102, for example, a media aware network element (MANE) or a stitching apparatus/an editing apparatus. In some cases, the post-processing entity 41 may be an example of a network entity. In some video coding systems, the post-processing entity 41 and the video encoder 102 may be components of separate apparatuses, while in other cases, functions described with respect to the post-processing entity 41 may be implemented by a same apparatus including the video encoder 102. In an example, the post-processing entity 41 is an example of the storage apparatus 40 in FIG. 1.

The video encoder 102 may derive and calculate the motion information of the current block in the second direction based on the motion information of the current block in the first direction, and further determine the prediction picture block of the current block based on the motion information of the current block in the first direction and the motion information of the current block in the second direction, to complete bi-directional inter predictive encoding.

As shown in FIG. 2, the video encoder 102 includes a transformer 301, a quantizer 302, an entropy encoder 303, a filter 306, a memory 307, a prediction processing unit 308, and a summator 312. The prediction processing unit 308 includes an intra predictor 309 and an inter predictor 310. To reconstruct a picture block, the video encoder 102 further includes an inverse quantizer 304, an inverse transformer 305, and a summator 311. The filter 306 is specified to represent one or more loop filters, for example, a deblocking filter, an adaptive loop filter, and a sample adaptive offset filter.

The memory 307 may store video data encoded by a component of the video encoder 102. The video data stored in the memory 307 may be obtained from the video source 101. The memory 307 may be a reference picture memory that stores reference video data used by the video encoder 102 to encode the video data in an intra or inter coding mode. The memory 307 may be a dynamic random access memory (dynamic RAM, DRAM) including a synchronous DRAM (synchronous DRAM, SDRAM), a magnetoresistive RAM (magnetoresistive RAM, MRAM), a resistive RAM (resistive RAM, RRAM), or a memory apparatus of another type.

The video encoder 102 receives video data and stores the video data in a video data memory. A partitioning unit partitions the video data into several picture blocks, and these picture blocks may be further partitioned into smaller blocks. For example, picture block partitioning based on a quadtree structure or a binary-tree structure is performed. The partitioning may further include partitioning into slices (slice), tiles (tile), or other larger units. The video encoder 102 is usually a component for encoding a picture block in a to-be-encoded video slice. The slice may be partitioned into a plurality of picture blocks (and may be partitioned into picture block sets that are referred to as tiles).

The intra predictor 309 in the prediction processing unit 308 may perform intra predictive encoding on a current block relative to one or more neighboring picture blocks that are in a same picture or slice as the current block, to remove spatial redundancy. The inter predictor 310 in the prediction processing unit 308 may perform inter predictive encoding on the current block relative to one or more prediction picture blocks in one or more reference pictures, to remove temporal redundancy.

The prediction processing unit 308 may provide obtained intra-coded and inter-coded picture blocks for the summator 312 to generate a residual block, and provide the residual block for the summator 311 to reconstruct a coding block used as a reference picture.

After the prediction processing unit 308 generates a prediction picture block of the current block through inter prediction and intra prediction, the video encoder 102 generates the residual picture block by subtracting the prediction picture block from the to-be-encoded current block. The summator 312 represents one or more components that perform this subtraction operation. Residual video data in the residual block may be included in one or more transform units (transform unit, TU), and used by the transformer 301. The transformer 301 transforms the residual video data into a residual transform coefficient through transform such as discrete cosine transform (discrete cosine transform, DCT) or conceptually similar transform. The transformer 301 may transform the residual video data from a sample value domain to a transform domain, for example, a frequency domain.

The transformer 301 may send the obtained transform coefficient to the quantizer 302. The quantizer 302 quantizes the transform coefficient to further reduce a bitrate. In some examples, the quantizer 302 may further scan a matrix including a quantized transform coefficient. Alternatively, the entropy encoder 303 may perform scanning.

After quantization, the entropy encoder 303 performs entropy encoding on the quantized transform coefficient. For example, the entropy encoder 303 may perform context-adaptive variable-length coding (context-adaptive variable-length coding, CAVLC), context-adaptive binary arithmetic coding (context-adaptive binary arithmetic coding, CABAC), or another entropy coding method or technology. After the entropy encoder 303 performs entropy encoding, an encoded bitstream may be sent to the video decoder 202, or archived for subsequent sending or subsequent retrieval by the video decoder 202. The entropy encoder 303 may further perform entropy encoding on a syntax element of the to-be-encoded current block.

The inverse quantizer 304 and the inverse transformer 305 respectively perform inverse quantization and inverse transform, to reconstruct the residual block in a sample domain, for example, to be subsequently used as a reference block of the reference picture. The summator 311 adds a reconstructed residual block to the prediction picture block generated by the inter predictor 310 or the intra predictor 309, to generate a reconstructed picture block. A prediction picture block of a picture block can be obtained by performing processing (such as interpolation) on a reference picture block of the picture block.

It should be understood that other structural variants of the video encoder 102 may be used to encode a video stream. For example, for some picture blocks or pictures, the video encoder 102 may directly quantize a residual signal, and correspondingly, processing by the transformer 301 and the inverse transformer 305 is not required. Alternatively, for some picture blocks or pictures, the video encoder 102 does not generate residual data, and correspondingly, processing by the transformer 301, the quantizer 302, the inverse quantizer 304, and the inverse transformer 305 is not required. Alternatively, the video encoder 102 may directly store the reconstructed picture block as the reference block without processing by the filter 306. Alternatively, the quantizer 302 and the inverse quantizer 304 in the video encoder 102 may be combined.

Figure 3:
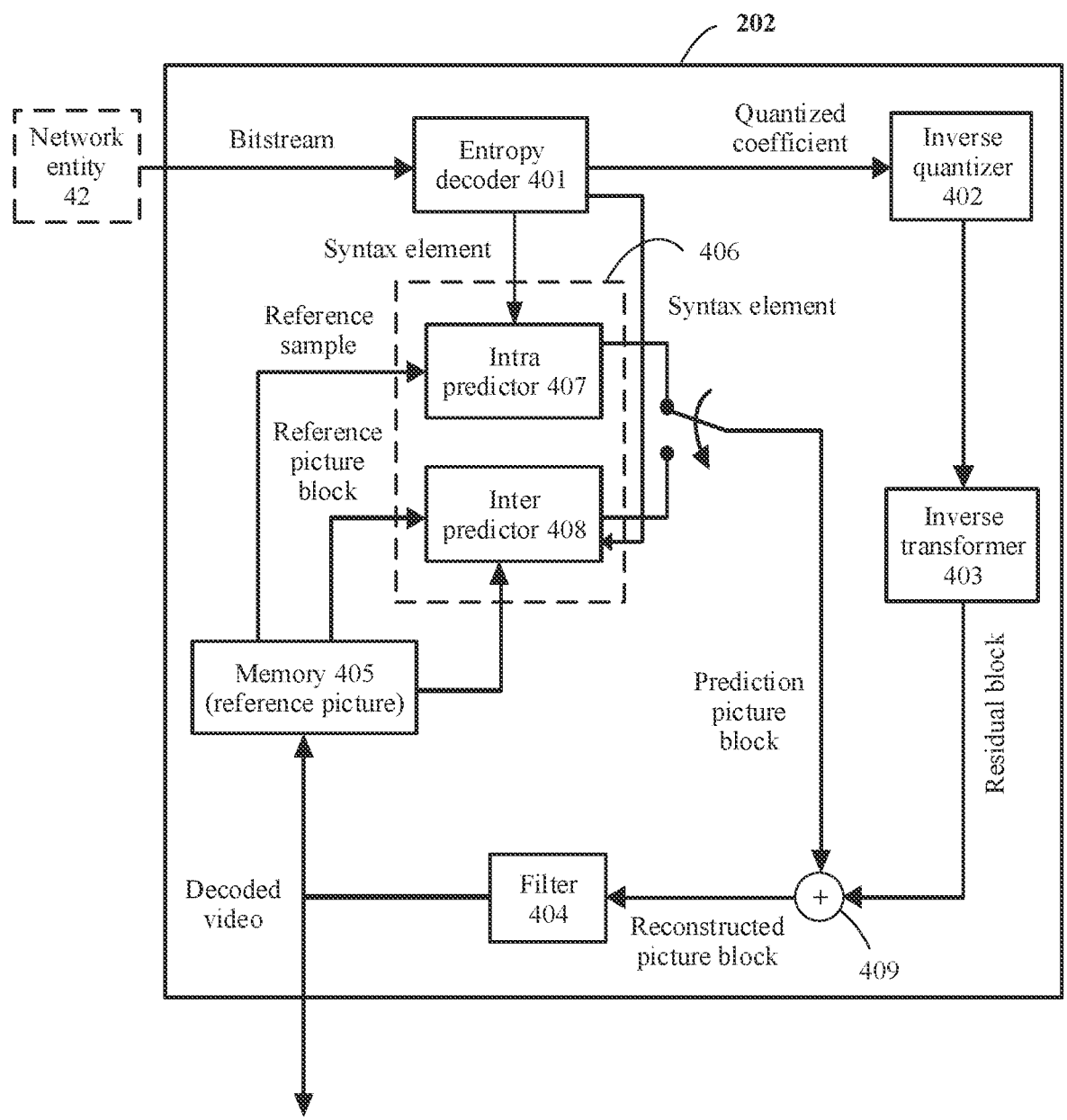
FIG. 3 is a schematic structural diagram of a video decoder according to an embodiment of this application.

FIG. 3 is a schematic structural diagram of the video decoder 202 according to an embodiment of this application. As shown in FIG. 3, the video decoder 202 includes an entropy decoder 401, an inverse quantizer 402, an inverse transformer 403, a filter 404, a memory 405, a prediction processing unit 406, and a summator 409. The prediction processing unit 406 includes an intra predictor 407 and an inter predictor 408. In some examples, the video decoder 202 may perform a decoding process that is roughly inverse to the encoding process described with respect to the video encoder 102 in FIG. 2.

In the decoding process, the video decoder 202 receives a bitstream from the video encoder 102. The video decoder 202 may receive video data from a network entity 42, and optionally, may further store the video data in a video data memory (not shown in the figure). The video data memory may store video data that is to be decoded by a component of the video decoder 202, for example, the encoded bitstream. The video data stored in the video data memory may be obtained from, for example, a local video source such as the storage apparatus 40 or a camera through wired or wireless network communication of the video data, or by accessing a physical data storage medium. Although the video data memory is not shown in FIG. 3, the video data memory and the memory 405 may be a same memory, or may be separately disposed memories. The video data memory and the memory 405 each may include any one of a plurality of types of memory apparatuses, for example, a dynamic random access memory (DRAM) including a synchronous DRAM (SDRAM), a magnetoresistive RAM (MRAM), a resistive RAM (RRAM), or another type of memory apparatus. In various examples, the video data memory may be integrated onto a chip together with other components of the video decoder 202, or may be disposed outside the chip relative to those components.

The network entity 42 may be, for example, a server a MANE, a video editor/clipper, or another apparatus configured to implement one or more of the technologies described above. The network entity 42 may or may not include a video encoder, for example, the video encoder 102. Before the network entity 42 sends the bitstream to the video decoder 202, the network entity 42 may implement a part of the technologies described in this application. In some video decoding systems, the network entity 42 and the video decoder 202 may be components of separate apparatuses. In other cases, functions described with respect to the network entity 42 may be implemented by a same apparatus including the video decoder 202. In some cases, the network entity 42 may be an example of the storage apparatus 40 in FIG. 1.

The entropy decoder 401 of the video decoder 202 performs entropy decoding on the bitstream to generate a quantized coefficient and some syntax elements. The entropy decoder 401 forwards the syntax elements to the filter 404. The video decoder 202 may receive syntax elements/a syntax element at a video slice level and/or a picture block level. In this application, in an example, the syntax element herein may include the indication information related to the current block, and the indication information is used to indicate to determine the second motion information based on the first motion information. In addition, in some examples, the video encoder 102 may send a signal to notify a specific syntax element indicating whether to determine the second motion information based on the first motion information.

The inverse quantizer 402 performs inverse quantization on, that is, dequantizes, quantized transform coefficient provided in the bitstream and decoded by the entropy decoder 401. An inverse quantization process may include: determining a to-be-applied quantization degree by using a quantization parameter calculated by the video encoder 102 for each picture block in a video slice, and similarly determining a to-be-applied inverse quantization degree. The inverse transformer 403 applies inverse transform, for example, inverse DCT, inverse integer transform, or a conceptually similar inverse transform process, to the transform coefficient, to generate a residual block in a sample domain.

After the prediction processing unit 406 generates a prediction picture block for the current block or a subblock of the current block, the video decoder 202 summates the residual block front the inverse transformer 403 and the corresponding prediction picture block generated by the prediction processing unit 406, to obtain a reconstructed block, that is, a decoded picture block. The summator 409 (which is also referred to as a reconstructor 409) represents a component that performs this summation operation. When necessary, a filter (in or after a decoding loop) may be further used to smoothen samples, or video quality may be improved in another manner. The filter 404 may be one or more loop filters, for example, a deblocking filter, an adaptive loop filter (ALF), and a sample adaptive offset (SAO) filter.

It should be understood that other structural variants of the video decoder 202 may be used to decode the bitstream. For example, for some picture blocks or pictures, the entropy decoder 401 of the video decoder 202 does not obtain the quantized coefficient through decoding, and correspondingly, processing by the inverse quantizer 402 and the inverse transformer 403 is not required. For example, the inverse quantizer 402 and the inverse transformer 403 in the video decoder 202 may be combined.

With reference to the video coding system 1 shown in FIG. 1, the video encoder 102 shown in FIG. 2, and the video decoder 202 shown in FIG. 3, the following describes in detail the bi-directional inter prediction method provided in this application.

FIG. 4 is a schematic flowchart of a bi-directional inter prediction method according to an embodiment of this application. The method shown in FIG. 4 is performed by a bi-directional inter prediction apparatus. The bi-directional inter prediction apparatus may be the video decoder 202 in FIG. 1. FIG. 4 is described by using an example in which the bi-directional inter prediction apparatus is the video decoder 202.

As shown in FIG. 4, the bi-directional inter prediction method in this embodiment of this application may include the following steps.

S400: The (video decoder 202) parses an obtained bitstream, and obtains indication information.

Optionally, the video decoder 202 may parse the bitstream, and determine, based on a value of a syntax element in the bitstream, an inter prediction mode used to perform inter prediction on a current block in a current picture. When the inter prediction mode is a bi-directional inter prediction mode, the video decoder 202 obtains the indication information.

The video decoder 202 may receive the encoded bitstream sent by the video encoder 102, or may obtain the encoded bitstream from the storage apparatus 40.

Optionally, the video decoder 202 in this embodiment of this application determines, based on a value of a syntax element inter_pred_idc, the inter prediction mode used to perform inter prediction on the current block in the current picture. It can be learned from the foregoing description that inter prediction includes unidirectional inter prediction and bi-directional inter prediction. Optionally, when the value of the syntax element inter_pred_idc is 0, the video decoder 202 may determine that the inter prediction mode used to perform inter prediction on the current block in the current picture is forward inter prediction. When the value of the syntax element inter_pred_idc is 1, the video decoder 202 may determine that the inter prediction mode used to perform inter prediction on the current block in the current picture is backward inter prediction. When the value of the syntax element inter_pred_idc is 2, the video decoder 202 may determine that the inter prediction mode used to perform inter prediction on the current block in the current picture is bi-directional inter prediction.

Optionally, after determining that the value of the syntax element inter_pred_idc is 2, the video decoder 202 obtains the indication information used to indicate to determine second motion information based on first motion information. The first motion information is motion information of the current block in a first direction, the second motion information is motion information of the current block in a second direction, and the first direction is different from the second direction.

A picture block in this application may be a basic unit for performing video encoding or video decoding, for example, a coding unit (Coding Unit, CU), or may be a basic unit for performing a prediction operation, for example, a prediction unit (Prediction Unit, PU). This is not specifically limited in this embodiment of this application.

Optionally, the current block in this embodiment of this application may further include at least one subblock. Correspondingly, the first motion information may include motion information of each of the at least one subblock of the current block in the first direction, the second motion information may include motion information of each of the at least one subblock of the current block in the second direction, and the indication information may be used to indicate to determine motion information of a subblock in the second direction based on motion information of the subblock in the first direction. Optionally, the current block may alternatively be a subblock that cannot be partitioned.

The video decoder 202 may obtain the indication information in a plurality of manners, including but not limited to the following implementations.

In a first implementation, the video decoder 202 parses a first identifier. When a value of the first identifier is a first preset value, the video decoder 202 determines to parse the first motion information, and determines the second motion information based on the first motion information. When a value of the first identifier is an eighth preset value, the video decoder 202 parses the bitstream to obtain a fifth identifier. When a value of the fifth identifier is a fifth preset value, the video decoder 202 determines to parse the second motion information, and calculates the first motion information based on the second motion information. When a value of the fifth identifier is a ninth preset value, the video decoder 202 obtains the first motion information and the second motion information. For example, when the first preset value, the eighth preset value, the ninth preset value, and the fifth preset value represent true, the first preset value, the eighth preset value, the ninth preset value, and the fifth preset value each may be 1. Alternatively, when the first preset value, the eighth preset value, the ninth preset value, and the fifth preset value represent true, the first preset value, the eighth preset value, the ninth preset value, and the fifth preset value each may be 0. This is not limited in this application. For example, the first preset value, the eighth preset value, the ninth preset value, and the fifth preset value may be the same, or may be different, and for example, each may be either of 0 and 1. This is not specifically limited in this embodiment of this application. Specifically, the first identifier is first obtained. When the first identifier is the first preset value, it indicates that the second motion information can be determined based on the first motion information. If the first identifier is the eighth preset value, it indicates that the second motion information cannot be determined based on the first motion information. In this case, the fifth identifier needs to be obtained. When the fifth identifier is the fifth preset value, it indicates that the first motion information can be determined based on the second motion information. If the fifth identifier is the ninth preset value, it indicates that the first motion information and the second motion information can be obtained through parsing. In this case, the first motion information and the second motion information cannot be derived from each other.

For example, the first identifier may be mv_derived_flag_l0, the fifth identifier may be mv_derived_flag_l1, both the first preset value and the fifth preset value may be 1, and both the eighth preset value and the ninth preset value may be 0. The video decoder 202 first parses mv_derived_flag_l0. When a value of mv_derived_flag_l0 is 1, the video decoder 202 parses the first motion information, and determines the second motion information based on the first motion information. When a value of mv_derived_flag_l0 is 0, the video decoder 202 parses mv_derived_flag_l1. When a value of mv_derived_flag_l1 is 1, the video decoder 202 parses the second motion information, and calculates the first motion information based on the second motion information. When both a value of mv_derived_flag_l0 and a value of mv_derived_flag_l1 are 0, the video decoder 202 parses the first motion information and the second motion information.

It should be understood that the identifiers and the values in this embodiment of the present invention are merely examples, and diversity of the identifiers and the values is not exhaustive or limited in the present invention.

In a second implementation, the video decoder 202 parses a second identifier. When a value of the second identifier is a second preset value, the video decoder 202 determines to calculate motion information of the current block by using a motion information derivation algorithm. Then, the video decoder 202 parses a third identifier. When a value of the third identifier is a third preset value, the video decoder 202 determines to parse the first motion information, and determines the second motion information based on the first motion information. In other words, the video decoder 202 obtains the indication information. When a value of the third identifier is a sixth preset value, the video decoder 202 determines to parse the second motion information, and calculates the first motion information based on the second motion information.

Specifically, the second identifier is first obtained. When the second identifier is the second preset value, it indicates that one piece of motion information can be derived based on another piece of motion information. Further, the third identifier is obtained. When the value of the third identifier is the third preset value, it indicates that the second motion information can be determined based on the first motion information. When the value of the third identifier is the sixth preset value, it indicates that the first motion information can be determined based on the second motion information.

For example, the second identifier is derived_mv_flag, the third identifier is derived_mv_direction, the third preset value is 1, and the sixth preset value is 0. The video decoder 202 first parses derived_mv_flag. When a value of derived_mv_flag is 1, the video decoder 202 determines to calculate the motion information of the current block by using the motion information derivation algorithm. When a value of derived_mv_flag is 0, the video decoder 202 parses the first motion information and the second motion information. When a value of derived_mv_direction is 1, the video decoder 202 parses the first motion information, and determines the second motion information based on the first motion information. When a value of derived_mv_direction is 0, the video decoder 202 determines to parse the second motion information, and calculates the first motion information based on the second motion information.

In a third implementation, the video decoder 202 parses a second identifier. When a value of the second identifier is a second preset value, the video decoder 202 determines to calculate motion information of the current block by using a motion information derivation algorithm. Then, the video decoder 202 determines, based on a preset derivation direction, to parse the first motion information, and determines the second motion information based on the first motion information. In other words, the video decoder 202 obtains the indication information. In other words, in this implementation, "determining the second motion information based on the first motion information" is preset. When a value of the second identifier is a seventh preset value, the first motion information and the second motion information are parsed. In other words, in this case, the first motion information and the second motion information cannot be obtained through derivation.

For example, the second identifier is derived_mv_flag, the second preset value is and the seventh preset value is 0. The video decoder 202 parses derived_mv_flag. When a value of derived_mv_flag is 1, the video decoder 202 determines to calculate the motion information of the current block by using the motion information derivation algorithm. Further, the video decoder 202 determines to parse the first motion information, and determines the second motion information based on the first motion information. When a value of derived_mv_flag is 0, the video decoder 202 parses the first motion information and the second motion information.

In a fourth implementation, the video decoder 202 parses a fourth identifier (for example, mv_derived_flag_l0). When a value of the fourth identifier is a fourth preset value, the video decoder 202 determines to calculate motion information of the current block by using a motion information derivation algorithm, and calculates a variable derived_ref_num based on a first reference picture list and a second reference picture list. The variable represents a quantity of mirrored/linear reference picture pairs that can be formed based on a first reference picture and a second reference picture. When the quantity of reference picture pairs is 1, the video decoder 202 directly determines reference picture index values. Then, the video decoder 202 determines, based on a preset derivation direction, to parse the first motion information, and determines the second motion information based on the first motion information. The first reference picture list is a reference picture list of the current block in the first direction, the second reference picture list is a reference picture list of the current block in the second direction, the first reference picture is a reference picture of the current block in the first direction, and the second reference picture is a reference picture of the current block in the second direction. A reference picture index value in this embodiment of this application may refer to a number of a reference picture in a corresponding reference picture list.

For example, a picture order count (POC, picture order count) of the current picture is 4, the first reference picture list is {2, 0}, and the second reference picture list is {6, 7}. It is assumed that it is determined (for example, according to the following condition B or condition C) that a reference picture (which may be understood as the first reference picture) whose picture order count is 2 in the first reference picture list and a reference picture (which may be understood as the second reference picture) whose picture order count is 6 in the second reference picture list can form a reference picture pair. Therefore, it can be learned that an index value of the first reference picture in the first reference picture list and an index value of the second reference picture in the second reference picture list are 0. To be specific, when there is only one reference picture pair, the reference picture pair may be directly used as target reference pictures, and indices of locations corresponding to the target reference pictures in the reference picture lists are indices of the reference pictures. In this case, the index values of the reference pictures do not need to be obtained through parsing.

In a possible specific implementation, elements in a reference picture list may be some marks, including but not limited to picture order counts POCs of reference pictures. One picture order count may correspond to one specific reference picture and/or an index of a location of the reference picture in the reference picture list, that is, a reference picture index.

In a possible specific implementation, elements in a reference picture list may be pictures (reference pictures). One picture may correspond to one specific POC and an index of a location of the picture in the reference picture list, that is, a reference picture index.

It is assumed that a picture order count of the current picture is 4, the first reference picture list is {2, 0}, the second reference picture list is {6, 7}, and it is determined (according to the following condition B or condition C) that a reference picture (which may be understood as the first reference picture) whose picture order count is 2 in the first reference picture list and a reference picture (which may be understood as the second reference picture) whose picture order count is 6 in the second reference picture list can form a reference picture pair and a reference picture whose picture order count is 0 in the first reference picture list and a reference picture whose picture order count is 7 in the second reference picture list can also form a reference picture pair. In this case, the video decoder 202 needs to parse reference picture index values. In other words, when there are a plurality of pairs of reference pictures, index values of the reference pictures may be obtained through parsing.

Further, when determining that the inter prediction mode is a bi-directional inter prediction mode, the video decoder 202 may further determine whether feature information of the current picture satisfies a preset condition (including but not limited to the following conditions A, B, C, D, and/or E). In this way, when the feature information of the current picture satisfies the preset condition, the video decoder 202 obtains the indication information. In other words, a specific process of S400 may alternatively be as follows: The video decoder 202 obtains the indication information when determining that the inter prediction mode is the bi-directional inter prediction mode and the feature information of the current picture satisfies the preset condition.

The feature information of the current picture may include but is not limited to at least one of a picture order count (POC), a temporal level identifier (Temporal Level ID, TID) and/or a quantity of reference pictures. The bitstream obtained by the video decoder 202 includes a sequence parameter set (Sequence Parameter Set, SPS), a picture parameter set (Picture Parameter Set, PPS), a slice header (slice header) or a slice segment header (slice segment header), and encoded picture data. Then, the video decoder 202 parses the bitstream to obtain the feature information of the current picture.

Optionally, the preset condition includes at least one of the following conditions:

Condition A: The current block has at least two reference pictures.

Condition B: The picture order count of the current picture, a picture order count of the first reference picture, and a picture order count of the second reference picture satisfy the following formula:

$$POC\_Cur-POC\_listX=POC\_listY-POC\_Cur.$$

Herein, POC_Cur represents the picture order count of the current picture, POC_listX represents the picture order count of the first reference picture, POC_listY represents the picture order count of the second reference picture, the first reference picture is a reference picture of the current block in the first direction, the second reference picture is a reference picture of the current block in the second direction, the first reference picture may be in the first reference picture list, and the second reference picture may be in the second reference picture list.

Condition C: The picture order count of the current picture, a picture order count of the first reference picture, and a picture order count of the second reference picture satisfy the following formula:

$$(POC\_Cur-POC\_listX)*(POC\_listY-POC\_Cur)>0.$$

Herein, POC_Cur represents the picture order count of the current picture, POC_listX represents the picture order count of the first reference picture, POC_listY represents the picture order count of the second reference picture, the first reference picture is a reference picture of the current block in the first direction, and the second reference picture is a reference picture of the current block in the second direction. It is clear that, this formula specifically indicates that the picture order count of the current picture needs to be between the picture order count of the first reference picture and the picture order count of the second reference picture. More specifically, this formula may indicate that one of the first reference picture and the second reference picture is before the current picture in a time sequence, and the other is after the current picture in the time sequence.

Condition D: The TID of the current picture is greater than or equal to a preset value.

The preset condition in this embodiment of this application may be preset, or may be specified in a higher layer syntax, for example, in a parameter set such as the SPS, the PPS, the slice header (slice header), or the slice segment header (slice segment header). This is not specifically limited in this embodiment of this application.

Condition E: mvd_l1_zero_flag of the current picture is 0.

mvd_l1_ zero_flag is a flag bit obtained by the video decoder 202 through parsing. When mvd_l1_zero_flag is 1, it indicates that an MVD of List1 does not need to be parsed. (mvd_l1_zero_flag_equal to 1 indicates that the mvd_coding(x0, y0, 1) syntax structure is not parsed and MvdL1[x0][y0][compIdx] is set equal to 0 for compIdx=0, 1. mvd_l1_zero_flag equal to 0 indicates that the mvd_coding (x0, y0, 1) syntax structure is parsed). To be specific, mvd_l1_zero_flag=1 may be used to indicate that a second motion vector difference is 0, and mvd_l1_zero_flag=0 may be used to indicate whether a second motion vector difference needs to be parsed or derived.

Specifically, for the condition B (or the condition C), the video decoder 202 obtains a picture order count of one reference picture from each of the first reference picture list and the second reference picture list, and determines whether the obtained picture order count of the reference picture and the picture order count of the current picture satisfy the condition B or the condition C. The indication information is obtained when the condition B (or the condition C) is satisfied. It should be understood that the video decoder 202 may obtain any reference picture from each of the first reference picture list and the second reference picture list to perform condition matching.

Optionally, for the condition A, the video decoder 202 sets a reference picture index value (SymRefIdxX) in the first direction to 0, and sets a reference picture index value (SymRefIdxY) in the second direction to 0.

Optionally, for the condition B, the video decoder 202 searches the first reference picture list for a reference picture that is closest to the current picture and whose picture order count is less than the picture order count of the current picture, where the reference picture or the picture order count of the reference picture may be represented as POC_listX; and the video decoder 202 searches the second reference picture list for a reference picture that satisfies POC_Cur−POC_listX=POC_listY−POC_Cur, where the reference picture or a picture order count of the reference picture may be represented as POC_listY. If the reference pictures POC_listX and POC_listY that satisfy the requirements can be found in this search manner, the reference picture index value (SymRefIdxX) in the first direction is set to an index value of POC_listX in the first reference picture list, and the reference picture index value (SymRefIdxY) in the second direction is set to an index value of POC_listY in the second reference picture list. Optionally, if the reference pictures POC_listX and POC_listY that satisfy the requirements cannot be found, the video decoder 202 further searches for a reference picture POC_listX that is closest to the current picture and whose picture order count is greater than the picture order count of the current picture; and the video decoder 202 searches the second reference picture list for a reference picture POC_listY that satisfies POC_Cur−POC_listX=POC_listY−POC_Cur. If the reference pictures POC_listX and POC_listY that satisfy the requirements can be found in this search manner, the reference picture index value (SymRefIdxX) in the first direction is set to an index value of POC_listX in the first reference picture list, and the reference picture index value (SymRefIdxY) in the second direction is set to an index value of POC_listY in the second reference picture list. The first direction may correspond to the first reference picture list, and the second direction may correspond to the second reference picture list.

Optionally, for the foregoing possible conditions such as the condition C, the video decoder 202 searches the first reference picture list for a reference picture that is closest to the current picture and whose picture order count is less than the picture order count of the current picture, where the reference picture or the picture order count of the reference picture may be represented as POC_listX; and the video decoder 202 searches the second reference picture list for a reference picture that is closest to the current picture and whose picture order count is greater than the picture order count of the current picture, where the reference picture or the picture order count of the reference picture may be represented as POC_listY. If the reference pictures POC_listX and POC_listY that satisfy the requirements can be found in this search manner, the reference picture index value (SymRefIdxX) in the first direction is set to an index value of POC_listX (which may also correspond to a reference picture whose POC is POC_listX) in the first reference picture list, and the reference picture index value (SymRefIdxY) in the second direction is set to an index value of POC_listY (which may also correspond to a reference picture whose POC is POC_listY) in the second reference picture list. Optionally, if the reference pictures POC_listX and POC_listY that satisfy the requirements cannot be found, the video decoder 202 further searches for a reference picture POC_listX that is closest to the current picture and whose picture order count is greater than the picture order count of the current picture; and the video decoder 202 searches the second reference picture list for a reference picture POC_listY that is closest to the current picture and whose picture order count is less than the picture order count of the current picture. If the reference pictures POC_listX and POC_listY that satisfy the requirements can be found in this search manner, the reference picture index value (SymRefIdxX) in the first direction is set to an index value of POC_listX in the first reference picture list, and the reference picture index value (SymRefIdxY) in the second direction is set to a reference picture index value of POC_listY in the second reference picture list. The first direction may correspond to the first reference picture list, the second direction may correspond to the second reference picture list, and vice versa.

The searching the first reference picture list (for example, Lt)) for the reference picture that is closest to the current picture and whose picture order count is less than the picture order count of the current picture may be syntactically expressed by using the following expression:

$$\text{DiffPicOrderCnt(currPic,RefPicList}[0][i])>0,$$

$$\text{DiffPicOrderCnt(currPic,RefPicList}[0][i])<\text{DiffPicOrderCnt(currPic,RefPicList}[0][\text{RefIdxSymL0}])$$

RefIdxSymL0 is set to i.

In the first reference picture list, a reference picture whose index is RefIdxSymL0 is the found reference picture.

The searching the second reference picture list (for example, L1) for the reference picture that is closest to the current picture and whose picture order count is greater than the picture order count of the current picture may be syntactically expressed by using the following expression:

$$\text{DiffPicOrderCnt(currPic,RefPicList}[1][i])<0,$$

$$\text{DiffPicOrderCnt(currPic,RefPicList}[1][i])>\text{DiffPicOrderCnt(currPic,RefPicList}[1][\text{RefIdxSymL1}][i])<0,$$

RefIdxSymL1 is set to i.

In the second reference picture list, a reference picture whose index is RefIdxSymL1 is the found reference picture.

The searching the second reference picture list (for example, L1) for the reference picture that is closest to the current picture and whose picture order count is less than the picture order count of the current picture may be syntactically expressed by using the following expression:

$$\text{DiffPicOrderCnt(currPic,RefPicList}[1][i])>0,$$

$$\text{DiffPicOrderCnt(currPic,RefPicList}[1][i])<\text{DiffPicOrderCnt(currPic,RefPicList}[1][\text{RefIdxSymL1}]),$$

RefIdxSymL1 is set to i.

In the second reference picture list, a reference picture whose index is RefIdxSymL1 is the found reference picture.

The searching the first reference picture list (for example, L0) for the reference picture that is closest to the current picture and whose picture order count is greater than the picture order count of the current picture may be syntactically expressed by using the following expression:

DiffPicOrderCnt(currPic,RefPicList[0][i])<0,

DiffPicOrderCnt(currPic,RefPicList[0][i])>DiffPi-
cOrderCnt(currPic,RefPicList[0][RefIdxSymL0])

RefIdxSvmL0 is set to i.

In the first reference picture list, a reference picture whose index is RefIdxSymL0 is the found reference picture.

In conclusion, a policy for determining a reference picture (or an index) is provided. L0 is first searched for a reference picture (or an index) with a closest forward POC, and then L1 is searched for a reference picture (or an index) with a closest backward POC. If one of the reference pictures is not found or neither of the reference pictures is found, L1 may be first searched for a reference picture (or an index) with a closest forward POC, and then L0 is searched for a reference picture (or an index) with a closest backward POC. "Forward" may indicate that the POC is less than the POC of the current picture, that is, may indicate that a specific reference picture is before the current picture in a play sequence/display sequence, and "backward" may indicate that the POC is greater than the POC of the current picture, that is, may indicate that a specific reference picture is after the current picture in a play sequence/display sequence.

In this embodiment of this application, when it is determined that the inter prediction mode is the bi-directional inter prediction mode and the feature information of the current picture satisfies the preset condition, a method in which "the video decoder 202 obtains the indication information" may be the same as that used when it is determined that the inter prediction mode is the bi-directional inter prediction mode.

With reference to the foregoing descriptions, Table 1 is a syntax table used by the video decoder 202 to obtain the indication information in the first implementation when it is determined that the inter prediction mode is the bi-directional inter prediction mode and the feature information of the current picture satisfies the preset condition. prediction_unit( ) is a syntax structure of a prediction picture block, and may describe a method for determining motion information of each subblock in the current block.

In Table 1, x0 and y0 respectively represent a horizontal coordinate offset and a vertical coordinate offset of a subblock in the current block relative to the top-left corner of the current block, nPbW represents the width of the current block, and nPbH represents the height of the current block. When a value of inter_pred_idc[x0][y0] is PRED_L0, it indicates that inter prediction on a current subblock is forward prediction. When a value of inter_pred_idc[x0][y0] is PRED_L1, it indicates that inter prediction on a current subblock is backward prediction. When a value of inter_pred_idc[x0][y0] is PRED_BI, it indicates that inter prediction on a current subblock is bi-directional prediction.

For bi-directional inter prediction (that is, inter_pred_idc[x0][y0]==PRED_BI), if the preset condition (conditions) is satisfied, mv_derived_flag_l0[x0][y0] is parsed. If the value of mv_derived_flag_l0 is not the first preset value, mv_derived_flag_l1[x0][y0] is parsed. When the value of mv_derived_flag_l0 is the first preset value or the value of mv_derived_flag_l1[x0][y0] is the fifth preset value, motion information of the subblock of the current block is determined. To be specific, a reference picture index value ref_idx_l0[x0][y0], a motion vector predictor flag mvp_l0_flag[x0][y0], and a motion vector difference mvd_coding(x0, y0, 0) are determined.

TABLE 1

```
prediction_unit(x0, y0, nPbW, nPbH) {
    ...
    /* motion vector coding */
    if( slice_type==B )
        inter_pred_idc[x0][y0]
    if( inter_pred_idc[x0][y0]==PRED_L0 ) {
        if( num_ref_idx_l0_active_minus1 > 0 )
            ref_idx_l0[x0][y0]
        mvd_coding( x0, y0, 0 )
        mvp_l0_flag[x0][y0]
    }
    if( inter_pred_idc[x0][y0]==PRED_L1 ) {
        if( num_ref_idx_l1_active_minus1 > 0 )
            ref_idx_l1[x0][y0]
        mvd_coding( x0, y0, 1)
        mvp_l1_flag[x0][y0]
    }
    if( inter_pred_idc[x0][y0]==PRED_BI ) {
        if( conditions ) {
            mv_derived_flag_l0[x0][y0]
            if( !mv_derived_flag_l0[x0][y0]) {
                mv_derived_flag_l1[x0][y0]
            }
        }
        if( !mv_derived_flag_l0[x0][y0]) {
            if( num_ref_idx_l0_active_minus1 > 0 )
                ref_idx_l0[x0][y0]
            mvd_coding( x0, y0, 0 )
            mvp_l0_flag[x0][y0]
        }
        if( !mv_derived_flag_l1[x0][y0]) {
            if( num_ref_idx_l1_active_minus1 > 0 )
                ref_idx_l1[x0][y0]
            mvd_coding(x0, y0, 0 )
            mvp_l1_flag[x0][y0]
        }
    }
}
```

With reference to the foregoing descriptions, Table 2 is a syntax table used by the video decoder 202 to obtain the indication information in the third implementation when it is determined that the inter prediction mode is the bi-directional inter prediction mode and the feature information of the current picture satisfies the preset condition.

In Table 2, for bi-directional inter prediction (that is, inter_pred_idc[x0][y0])==PRED_BI), if the preset condition (conditions) is satisfied, derived_mv_flag[x0][y0] is parsed. If a value of derived_mv_flag[x0][y0] is the second preset value, motion information of the subblock of the current block is determined. To be specific, a reference picture index value ref_idx_lx[x0][y0], a motion vector predictor flag mvp_lx_flag[x0][y0], and a motion vector difference mvd_coding(x0, y0, x) are determined.

TABLE 2

```
prediction_unit(x0, y0, nPbW, nPbH) {
    ...
    /* motion vector coding */
    if( slice_type==B )
        inter_pred_idc[x0][y0]
    if( inter_pred_idc[x0][y0]==PRED_L0 ) {
        if( num_ref_idx_l0_active_minus1 > 0 )
            ref_idx_l0[x0][y0]
        mvd_coding( x0, y0, 0 )
        mvp_l0_flag[x0][y0]
    }
    if( inter_pred_idc[x0][y0]==PRED_L1 ) {
        if( num_ref_idx_l1_active_minus1 > 0 )
            ref_idx_l1[x0][y0]
        mvd_coding( x0, y0, 1)
        mvp_l1_flag[x0][y0]
    }
    if( inter_pred_idc[x0][y0]==PRED_BI ) {
        if( conditions ) {
            derived_mv_flag[ x0 ][ y0 ]
```

TABLE 2-continued

```
            if( derived_mv_flag[x0][y0] ) {
                if( num_ref_idx_lx_active_minus1 > 0 )
                    ref_idx_lx[ x0 ][ y0 ]
                mvd_coding( x0, y0, x )
                mvp_lx_flag[ x0 ][ y0 ]
            } else {
                ......
            }
        }
    }
```

With reference to the foregoing descriptions, Table 3 is a syntax table used by the video decoder 202 to obtain the indication information in the fourth implementation when it is determined that the inter prediction mode is the bi-directional inter prediction mode and the feature information of the current picture satisfies the preset condition.

In Table 3, for bi-directional inter prediction (that is, inter_pred_idc[x0][y0]=PRED_BI), if the preset condition (conditions) is satisfied, derived_mv_flag[x0][y0] is parsed. If a value of derived_mv_flag[x0][y0] is the fourth preset value, derived_ref_num is determined, and when a value of derived_ref_num is greater than 1, motion information of the subblock of the current block is determined. To be specific, a reference picture index value ref_idx_lx[x0][y0], a motion vector predictor flag mvp_lx_flag[x0][y0], and a motion vector difference mvd_coding(x0, y0, x) are determined.

TABLE 3

```
prediction_unit(x0, y0, nPbW, nPbH) {
    ...
        /* motion vector coding */
    if( slice_type==B )
            inter_pred_idc[x0][y0]
    if( inter_pred_idc[x0][y0]==PRED_L0 ) {
            if( num_ref_idx_l0_active_minus1 > 0 )
                ref_idx_l0[x0][y0]
            mvd_coding( x0, y0, 0 )
            mvp_l0_flag[x0][y0]
        }
    if( inter_pred_idc[x0][y0]==PRED_L1 ) {
            if( num_ref_idx_l1_active_minus1 > 0 )
                ref_idx_l1[x0][y0]
    mvd_coding( x0, y0, 1)
    mvp_l1_flag[x0][y0]
    }
    if( inter_pred_idc[x0][y0]==PRED_BI ) {
            if( conditions ) {
                derived_mv_flag[x0][y0]
                if( derived_mv_flag[x0][y0] ) {
                    if( num_ref_idx_lx_active_minus1 > 0 && derived_ref_num > 1)
                        ref_idx_lx[x0][y0]
                    mvd_coding(x0, y0, x )
                    mvp_lx_flag[x0][y0]
                } else {
                    ......
                }
            }
    }
```

The first identifier, the second identifier, the third identifier, and the fourth identifier may all be preset, or may be specified in a higher layer syntax, for example, in a parameter set such as an SPS, a PPS, a slice header (slice header), or a slice segment header (slice segment header). This is not specifically limited in this embodiment of this application.

The video decoder 202 obtains the indication information when determining that the inter prediction mode is the bi-directional inter prediction mode and the feature information of the current picture satisfies the preset condition. This effectively improves a decoding rate of the video decoder 202, and reduces information redundancy.

S401: The video decoder 202 obtains the first motion information.

Optionally, the video decoder 202 parses the bitstream to obtain an index value of the first reference picture, a first motion vector predictor flag, and a first motion vector difference, that is, to obtain the first motion information. The first motion vector predictor flag is used to indicate an index value of a first predicted motion vector in a first candidate predicted motion vector list, the first predicted motion vector is a predicted motion vector of the current block in the first direction, the first motion vector difference is a difference between the first predicted motion vector and a first motion vector, and the first motion vector is a motion vector of the current block in the first direction.

Optionally, a reference picture at a first location in the reference picture list is usually a picture closest to the current picture. Therefore, the index value ref_lX_idx of the first reference picture may be directly set to 0.

Optionally, when the video decoder 202 determines, according to the preset condition B or C, whether to obtain the indication information, the video decoder 202 may set the index value ref_lX_idx of the first reference picture to a predetermined value SymRefIdxX. For example, when the preset condition B or C is satisfied, the indication information may be obtained, and the index value ref_lX_idx of the first reference picture may be set to the predetermined value SymRefIdxX. X may be 0 or 1.

Optionally, the first candidate predicted motion vector list is constructed based on the index value of the first reference picture. Specifically, in a process of constructing the first candidate predicted motion vector list, a motion vector of a neighboring decoded picture block of the current block is obtained. The picture order count of the first reference picture is determined based on the index value of the first reference picture and the first reference picture list. If a picture order count of a reference picture of the neighboring decoded picture block is different from the picture order count of the first reference picture, the motion vector of the neighboring decoded picture block needs to be scaled to point to the first reference picture, and then is added to the first candidate predicted motion vector list.

In each of the syntax tables shown in Table 1 to Table 3, the video decoder 202 determines motion information of the subblock of the current block in the first direction.

S402: The video decoder 202 determines the second motion information based on the first motion information.

In a first implementation, a method used by the video decoder 202 to determine the second motion information is as follows: The video decoder 202 selects the index value (which may also be briefly referred to as an index) of the first reference picture from the first motion information, and determines the picture order count of the first reference picture based on the index value of the first reference picture and the first reference picture list; calculates the picture order count of the second reference picture based on the picture order count of the current picture and the picture order count of the first reference picture according to a preset formula; determines an index value of the second reference picture based on the picture order count of the second reference picture and the second reference picture list; and determines the second motion information based on the first motion information and the index of the second reference picture.

Herein, the preset formula may be POC_listY=2 POC_Cur−POC_listX. POC_Cur represents the picture order count of the current picture. POC_listX represents the picture order count of the first reference picture, and POC_listY represents the picture order count of the second reference picture.

For example, if the picture order count of the current picture is 4, the picture order count of the first reference picture is 2, the second reference picture list is {6, 8} and it is determined, according to the formula POC_listY=2*POC_Cur−POC_listX, that the picture order count of the second reference picture is 6, the video decoder 202 determines that the index value ref_lY_idx of the second reference picture is 0.

Optionally, the preset formula may alternatively be (POC_Cur−POC_listX)*(POC_listY−POC_Cur)>0. It should be noted that, if picture order counts of a plurality of reference pictures in the second reference picture list satisfy the formula, the video decoder 202 first selects a reference picture with a minimum abs((POC_listY−POC_Cur)−(POC_Cur−POC_listX)), and then selects a reference picture with a minimum abs(POC_listY−POC_Cur), to determine the index value of the second reference picture. Herein, abs is an absolute value function.

For example, if the picture order count of the current picture is 4, the picture order count of the first reference picture is 2, the second reference picture list is {5, 7, 8}, and it is determined, according to the formula (POC_Cur−POC_listX)*(POC_listY−POC_Cur)>0, that the picture order count of the second reference picture is 5, the video decoder 202 determines that the index value ref_lY_idx of the second reference picture is 0.

Optionally, the preset formula may alternatively be POC_listX≠POC_listY. It should be noted that, if picture order counts of a plurality of reference pictures in the second reference picture list satisfy the formula, the video decoder 202 first selects a reference picture with a minimum abs((POC_listY−POC_Cur)−(POC_Cur−POC_listX)), and then selects a reference picture with a minimum abs(POC_listY−POC_Cur), to determine the index value of the second reference picture. Herein, abs is an absolute value function.

For example, if the picture order count of the current picture is 4, the picture order count of the first reference picture is 2, the second reference picture list is {3, 2, 1, 0}, and it is determined, according to the formula POC_listX≠POC_listY, that the picture order count of the second reference picture is 3, the video decoder 202 determines that the index value ref_lY_idx of the second reference picture is 0.

Optionally, the preset formula or condition may alternatively be POC_listY0=2*POC_Cur−POC_listX, (POC_Cur−POC_listX)*(POC_listY0'−POC_Cur)>0, and $POC_{listx}=POC_{listY0}$". An optional case is that all of the three conditions need to be satisfied. In this case, a method used by the video decoder 202 to determine the index value of the second reference picture is specifically: calculating a first picture order count based on the picture order count of the current picture and the picture order count of the first reference picture according to the formula POC_listY0=2*POC_Cur POC_listX, where POC_Cur represents the picture order count of the current picture, POC_listX represents the picture order count of the first reference picture, and POC_listY0 represents the first picture order count; and when the second reference picture list includes the first picture order count, determining, as the index value of the second reference picture, a number of a reference picture represented by the first picture order count in the second reference picture list; or when the second reference picture list does not include the first picture order count, calculating a second picture order count based on the picture order count of the current picture and the picture order count of the first reference picture according to (POC_Cur−POC_listX)*(POC_listY0'−POC_Cur)>0 where POC_listY0' represents the second picture order count, and when the second reference picture list includes the second picture order count, determining, as the index value of the second reference picture, a number of a reference picture represented by the second picture order count in the second reference picture list, or when the second reference picture list does not include the second picture order count, calculating a third picture order count based on the picture order count of the current picture and the picture order count of the first reference picture according to the condition POC_listX≠ POC_listY0", where POC_listY0" represents the third picture order count, and determining, as the index value of the second reference picture, a number of a reference picture represented by the third picture order count in the second reference picture list.

Optionally, a reference picture at a first location in the reference picture list is usually a picture closest to the current picture. Therefore, the index value ref_lY_idx of the second reference picture may be directly set to 0. Setting to 0 indicates pointing to the first location in the reference picture list.

Optionally, when the video decoder 202 determines, according to the preset condition B or C, whether to obtain the indication information, the video decoder 202 may set the index value ref_lY_idx of the second reference picture to a predetermined value SymRefIdxY. For example, when the preset condition B or C is satisfied, the indication information may be obtained, and the index value ref_lY_idx of the second reference picture may be set to the predetermined value SymRefIdxY.

In a second implementation, a method used by the video decoder 202 to determine the second motion information is as follows: The video decoder 202 parses the bitstream to obtain an index value of the second reference picture, and determines the second motion information based on the first motion information and the index value of the second reference picture. The index value of the second reference picture may be preset, or may be specified in a parameter set such as an SPS, a PPS, a slice header (slice header), or a slice segment header (slice segment header). This is not specifically limited in this embodiment of this application.

It can be learned that, in both the first implementation and the second implementation, the video decoder 202 determines the second motion information based on the first motion information and the index value of the second reference picture.

Optionally, the video decoder 202 may calculate all motion information of the current block in the second direction, or may calculate some motion information of the current block in the second direction.

The following describes a process in which the video decoder 202 determines the second motion information based on the first motion information and the index value of the second reference picture.

Optionally, a method in which "the video decoder 202 determines the second motion information based on the first motion information and the index value of the second reference picture" may be: obtaining the index value of the first reference picture in the first motion information, and determining the picture order count of the first reference picture based on the index value of the first reference picture and the first reference picture list; obtaining the index value of the second reference picture, and determining the picture order count of the second reference picture based on the index value of the second reference picture and the second reference picture list; determining the first motion vector (the motion vector of the current block in the first direction) based on the first motion vector difference and the first motion vector predictor flag that are in the first motion information and determining a second motion vector in the second motion information according to the following formula:

$$mv\_lY = \frac{POC\_Cur - POC\_listY}{POC\_Cur - POC\_listX} \times mv\_lX.$$

Herein, mv_lY represents the second motion vector, POC_Cur represents the picture order count of the current picture, POC_listX represents the picture order count of the first reference picture, POC_listY represents the picture order count of the second reference picture, mv_lX represents the first motion vector, and the second motion vector is a motion vector of the current block in the second direction.

The video decoder 202 constructs a candidate motion information list in a manner that is the same as the manner in which the encoder side constructs the candidate motion information list in the AMVP mode or the merge mode, and determines the first predicted motion vector in the candidate motion information list based on the first motion vector predictor flag. In this way, the video decoder 202 may determine a sum of the first predicted motion vector and the first motion vector difference as the first motion vector.

Optionally, when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, the video decoder 202 may directly set mv_lY=−lX.

Optionally, the video decoder 202 may not determine the foregoing situation about the forward reference picture and the backward reference picture, but directly set mv_lY=−mv_lX.

For example, both "the first reference picture is a forward reference picture of the current block and the second reference picture is a backward reference picture of the current block" and "the first reference picture is a backward reference picture of the current block and the second reference picture is a forward reference picture of the current block" may be represented by using a formula (POC_Cur−POC_listX)*(POC_listY−POC_Cur)>0, or may be represented by using a formula POC_listY=2*POC_Cur−POC_listX. In other words, both formulas may indicate that one of the first reference picture and the second reference picture is before the current picture in a time sequence, and the other is after the current picture in the time sequence.

Both "the first reference picture and the second reference picture each are a forward reference picture of the current block" and "the first reference picture and the second reference picture each are a backward reference picture of the current block" may be represented by using a formula (POC_Cur−POC_listX)*(POC_listY−POC_Cur)<0.

Optionally, a method in which "the video decoder 202 determines the second motion information based on the first motion information and the index value of the second reference picture" may be: obtaining the index value of the first reference picture and the first motion vector difference that are in the first motion information, and determining the picture order count of the first reference picture based on the index value of the first reference picture and the first reference picture list; obtaining the index value of the second reference picture, determining the picture order count of the second reference picture based on the index value of the second reference picture and the second reference picture list, and determining a second predicted motion vector based on the index value of the second reference picture and a second candidate predicted motion vector list, where the second predicted motion vector is a predicted motion vector of the current block in the second direction; determining a second motion vector difference in the second motion information according to the following formula:

$$mvd\_lY = \frac{POC\_Cur - POC\_listY}{POC\_Cur - POC\_listX} \times mvd\_lX,$$

where mv_lY represents the second motion vector difference, POC_Cur represents the picture order count of the current picture, POC_listX represents the picture order count of the first reference picture, POC_listY represents the picture order count of the second reference picture, and mvd_lX represents the first motion vector difference; and determining a second motion vector based on the second predicted motion vector and the second motion vector difference, where the second motion vector is a motion vector of the current block in the second direction.

Optionally, the second candidate predicted motion vector list is constructed based on the index value of the second reference picture. Specifically, in a process of constructing the second candidate predicted motion vector list, a motion vector of a neighboring decoded picture block of the current block is obtained. The picture order count of the second reference picture is determined based on the index value of the second reference picture and the second reference picture list. If a picture order count of a reference picture of the neighboring decoded picture block is different from the picture order count of the second reference picture, the motion vector of the neighboring decoded picture block needs to be scaled to point to the second reference picture, and then is added to the second candidate predicted motion vector list.

Optionally, when the first reference picture is a forward reference picture of the current block and the second reference picture is a backward reference picture of the current block, or when the first reference picture is a backward reference picture of the current block and the second reference picture is a forward reference picture of the current block, or when the first reference picture and the second reference picture each are a forward reference picture of the current block, or when the first reference picture and the second reference picture each are a backward reference picture of the current block, the video decoder 202 may directly set mvd_lY=−mvd_lX. For example, if (POC_Cur−POC_listX)*(POC_listY−POC_Cur)>0, POC_listY= 2*POC_Cur−POC_listX, or (POC_Cur−POC_listX)*(POC_listY−POC_Cur)<0, the video decoder 202 directly sets mvd_lY=−mvd_lX.

Optionally, the video decoder 202 may not determine the foregoing situation about the forward reference picture and the backward reference picture, but directly set mvd_lY=−mvd_lX.

mvd_lY is obtained, and then the second motion vector may be determined based on the second predicted motion vector and the second motion vector difference. In this method, derivation of the second motion vector difference is not related to a picture order count of a reference picture.

In conclusion, in this embodiment of the present invention, the second motion vector may be derived based on the first motion vector, or the second motion vector difference may be derived based on the first motion vector difference, so that the first motion vector and the second motion vector can be obtained. It should be understood that both obtaining of a motion vector predictor and calculation of a motion vector belong to the prior art, and details are not described herein.

S403: The video decoder 202 determines a prediction sample of the current block based on the first motion information and the second motion information.

Optionally, the video decoder 202 determines the first motion vector and the second motion vector in S402. In this way, the video decoder 202 may determine a first reference picture block based on the first motion vector, the index value of the first reference picture, and the first reference picture list, and determine a second reference picture block based on the second motion vector, the index value of the second reference picture, and the second reference picture list. Further, the video decoder 202 determines the prediction sample of the current block based on the first reference picture block and the second reference picture block. In other words, the video decoder 202 completes a motion compensation process.

For a method used by the video decoder 202 to determine the prediction sample of the current block based on the first reference picture block and the second reference picture block, refer to any existing method. This is not specifically limited in this embodiment of this application.

In the bi-directional inter prediction method provided in this embodiment of this application, the video decoder 202 may obtain only the first motion information from the encoded bitstream. After obtaining the first motion information, the video decoder 202 calculates the second motion information based on the first motion information, and further determines the prediction sample of the current block based on the first motion information and the second motion information. Compared with that in the prior art, in the method provided in this application, motion information of all picture blocks in all directions no longer needs to be transmitted. This effectively reduces an amount of transmitted motion information, and improves effective utilization of transmission resources, a transmission rate, and coding compression efficiency.

The bi-directional inter prediction method shown in FIG. 4 is described for the current block, that is, may be understood as performing inter prediction on the current block based on the AMVP mode.

It is easy to understand that the bi-directional inter prediction method provided in this application is also applicable to a non-translational motion model prediction mode, for example, a 4-parameter affine transform motion model, a 6-parameter affine transform motion model, or an 8-parameter bilinear motion model. In this scenario, the current block includes at least one subblock, and the motion information of the current block includes motion information of each of all subblocks of the current block. A method used by the video decoder 202 to determine the motion information (motion information in the first direction and motion information in the second direction) of each subblock is similar to the method used by the video decoder 202 to determine the motion information of the current block.

In the non-translational motion model prediction mode, the video decoder 202 calculates a motion vector of the control point in the second direction based on a motion vector of the control point in the first direction according to the following formula:

$$mvi\_lY = \frac{POC\_Cur - POC\_listY}{POC\_Cur - POC\_listX} \times mvi\_lX.$$

In this formula, mvi_lY represents the motion vector of the $i^{th}$ control point in the second direction, mvi_lX represents the motion vector of the $i^{th}$ control point in the first direction, POC_Cur represents the picture order count of the current picture, POC_listY represents the picture order count of the second reference picture, and POC_listX represents the picture order count of the first reference picture.

Correspondingly, the video decoder 202 calculates a motion vector difference of the $i^{th}$ control point in the second direction based on a motion vector difference of the $i^{th}$ control point in the first direction according to the following formula:

$$mvdi\_lY = \frac{POC\_Cur - POC\_listY}{POC\_Cur - POC\_listX} \times mvdi\_lX.$$

In this formula, mvdi_lY represents the motion vector difference of the $i^{th}$ control point in the second direction, mvdi_lX represents the motion vector difference of the $i^{th}$ control point in the first direction, POC_Cur represents the picture order count of the current picture, POC_listY represents the picture order count of the second reference picture, and POC_listX represents the picture order count of the first reference picture.

Corresponding to the video decoder 202, in this embodiment of this application, the video encoder 102 performs bi-directional motion estimation on the current block, to determine the motion information of the current block in the first direction, and calculates the motion information of the current block in the second direction based on the motion information of the current block in the first direction. In this way, the video encoder 102 determines the prediction picture block of the current block based on the motion information of the current block in the first direction and the motion information of the current block in the second direction. Then, the video encoder 102 performs operations such as transform and quantization on a residual between the current block and the prediction picture block of the current block to generate the bitstream, and sends the bitstream to the video decoder 202. The bitstream includes the motion information of the current block in the first direction. Further, the bitstream may include the indication information used to indicate to calculate the motion information in the second direction based on the motion information in the first direction.

For a method in which "the video encoder 102 calculates the motion information of the current block in the second direction based on the motion information of the current block in the first direction", refer to the foregoing method in which "the video decoder 202 determines the second motion information based on the first motion information", that is, refer to the descriptions in S402. Details are not described in this application.

Figure 5A:
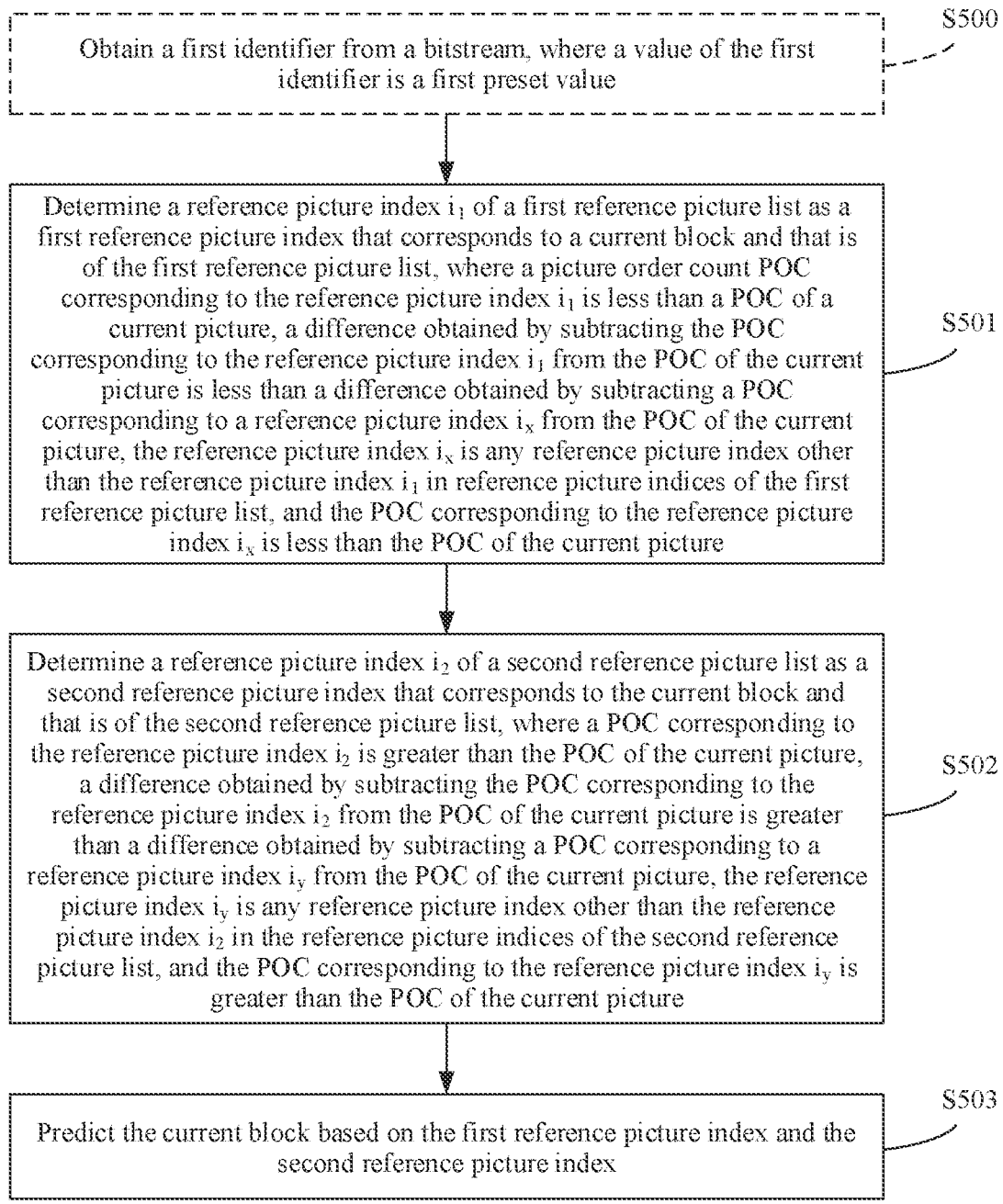
FIG. 5A is a schematic flowchart of another bi-directional inter prediction method according to an embodiment of this application.

According to the content described above, a bi-directional inter prediction method in the present invention may be obtained. Referring to FIG. 5A, the method includes the following steps.

S500: Obtain a first identifier from a bitstream, where a value of the first identifier is a first preset value (including but not limited to 1 or 0).

When the value of the first identifier is the first preset value, the first identifier may be used to indicate to determine a reference picture index $i_3$ of a first reference picture list as a first reference picture index that corresponds to a current block and that is of the first reference picture list, and determine a reference picture index $i_2$ of a second reference picture list as a second reference picture index that corresponds to the current block and that is of the second reference picture list.

In this case, a decoder may obtain a reference picture index without parsing the bitstream, and the reference picture index does not need to be transmitted in the bitstream either. It should be understood that S500 may occur before S501, in some examples, S500 may not be used as a necessary condition of S501. This is not limited in the present invention.

S501: Determine the reference picture index $i_1$ of the first reference picture list as the first reference picture index that corresponds to the current block and that is of the first reference picture list, where a POC corresponding to the reference picture index $i_1$ is less than a POC of a current picture, a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_x$ is any reference picture index other than the reference picture index $i_1$ in reference picture indices of the first reference picture list, and the POC corresponding to the reference picture index $i_x$ is less than the POC of the current picture. To be specific, the POC corresponding to the reference picture index $i_1$ is a POC, closest to the POC of the current picture, in all POCs that are in the first reference picture list and that are less than the POC of the current picture.

Examples are as follows:

Example A

The POC of the current picture in which the current block is located is 8, and the current picture has two reference picture lists: L0 {2, 3, 5, 6} (here 2, 3, 5, and 6 may represent POCs of reference pictures in L0) and L1 {9, 10, 11} (where 9, 10, and 11 may represent POCs of reference pictures in L1).

For L0, 2, 3, 5, and 6 are all less than 8, but 6 is closer to 8 than 2, and 5. An index of a reference picture corresponding to 6 in L0 is 3 (that is, the fourth element in the list). Therefore, $i_1=3$.

Example B

The POC of the current picture in which the current block is located is 7, and the current picture has two reference picture lists: L0 {9, 10, 12} (where 9, 10, and 12 may represent POCs of reference pictures in L0) and L1 {2, 4, 5} (where 2, 4, and 5 may represent POCs of reference pictures in L1).

Optionally, no POC that is less than 7 is found in L0. In this case, L1 may be searched for a POC that is less than 7 and closest to 7, and L0 is searched for a POC that is greater than 7 and closest to 7 (for details, refer to example B in S502).

For L1, 2, 4, and 5 are all less than 7, but 5 is closer to 7 than 2 and 4. An index of a reference picture corresponding to 5 in L0 is 2 (that is, the third element in the list). Therefore, $i_1=2$.

Example C

The POC of the current picture in which the current block is located is 7, and the current picture has two reference picture lists: L0{2, 4, 5, 8} (where 2, 4, 5, and 8 may represent POCs of reference pictures in L0) and L1 {6, 9, 10} (where 6, 9, and 10 may represent POCs of reference pictures in L1).

For L0, 2, 4, and 5 are all less than 7, but 5 is closer to 7 than 2 and 4. An index of a reference picture corresponding to 5 in L0 is 2 (that is, the third element in the list). Therefore, $i_1=2$.

S502: Determine the reference picture index $i_2$ of the second reference picture list as the second reference picture index that corresponds to the current block and that is of the second reference picture list, where a POC corresponding to the reference picture index $i_2$ is greater than the POC of the current picture, a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture. To be specific, the POC corresponding to the reference picture index $i_2$ is a POC, closest to the POC of the current picture, in all POCs that are in the second reference picture list and that are greater than the POC of the current picture.

The reference picture lists in S501 are still used as an example.

Example A

For L1, 9, 10, and 11 are all greater than 8, but 9 is closer to 8 than 10 and 11. An index of a reference picture corresponding to 9 in L1 is 0 (that is, the first element in the list). Therefore, $i_2=0$.

Example B

For L0, 9, 10, and 12 are all greater than 7, but 9 is closer to 7 than 10 and 12. An index of a reference picture corresponding to 9 in L0 is 0 (that is, the first element in the list). Therefore, $i_2=0$.

Example C

The FOC of the current picture in which the current block is located is 7, and the current picture has two reference picture lists: L0 {12, 4, 5, 8} (where 2, 4, 5, and 8 may represent POCs of reference pictures in L0) and L1 {6, 9, 101} (where 6, 9, and 10 may represent POCs of reference pictures in L1).

For L1, 9 and 10 are both greater than 7, but 9 is closer to 7 than 10. An index of a reference picture corresponding to 9 in L1 is 1 (that is, the second element in the list). Therefore, $i_2=1$.

It should be understood that a sequence of performing S501 and S502 is not limited in this application, and a time sequence relationship in the figure is merely an example.

It should be understood that, in a possible specific implementation, elements in a reference picture list may be some marks, including but not limited to picture order counts POCs of reference pictures. One picture order count may correspond to one specific reference picture and/or an index of a location of the reference picture in the reference picture list, that is, a reference picture index. In a possible specific implementation, elements in a reference picture list may be pictures (reference pictures). One picture may correspond to one specific FOC and an index of a location of the picture in the reference picture list, that is, a reference picture index.

It should be understood that. S501 and S502 provide a method for determining a reference picture index of a current block. To be specific, a bitstream does not need to be parsed, but the reference picture index of the current block is determined according to some constraint conditions. The constraint conditions provided in the present invention are merely an example for description, and does not constitute a limitation. In a specific implementation process, there may be variations of the constraint conditions or there may be more other constraint conditions, for example, some constraint conditions in standard evolution, which are not exhaustively enumerated in the present invention.

It should be understood that a sequence of L0 and L1 does not constitute a limitation, that is, a sequence relationship between the first reference picture list and the second reference picture list should not constitute a limitation. The first reference picture list may correspond to a first direction, and the second reference picture list may correspond to a second direction. The first direction and the second direction may be respectively a forward direction and a backward direction, or a backward direction and a forward direction, or both the first direction and the second direction may be forward directions or backward directions. The direction may also be understood as a time sequence, and is not limited in the present invention.

The present invention further provides a policy for determining a reference picture (or an index). L0 is first searched for a reference picture (or the reference picture index with a closest forward POC, and then L1 is searched for a reference picture (or the reference picture index $i_2$) with a closest backward POC. If one of the reference pictures is not found or neither of the reference pictures is found, L1 may be first searched for a reference picture (or the reference picture index $i_2$) with a closest forward POC, and then L0 is searched for a reference picture (or the reference picture index with a closest backward POC.

The first reference picture index and the second reference picture index correspond to reference pictures in which optimal reference blocks of the current block are located, that is, ref_idx_l0 and ref_idx_l1, or ref_idx_l1 and ref_idx_l0.

Optionally, for another implementation, refer to the reference picture index determining method in S400. Details are not described herein again.

S503: Predict the current block based on the first reference picture index and the second reference picture index, where the current picture includes the current block.

Optionally, the method further includes:
  obtaining a first predicted motion vector and a second predicted motion vector;
  determining a first motion vector based on the first predicted motion vector and a first motion vector difference; and
  determining a second motion vector based on the second predicted motion vector and a second motion vector difference.

Correspondingly, the predicting the current block based on the first reference picture index and the second reference picture index may include: predicting the current block based on the first reference picture index, the second reference picture index, the first reference picture list, the second reference picture list, the first motion vector, and the second motion vector. In this step, a common prediction method in the prior art may be used.

In a possible implementation, when the first identifier is the first preset value, the first identifier is further used to indicate to determine the second motion vector difference of the current block based on the first motion vector difference of the current block. In this case, the second motion vector difference may be derived based on the first motion vector difference, and the second motion vector difference does not need to be transmitted in a bitstream, thereby reducing the bitstream. In this case, the first motion vector difference of the current block may be first obtained, and the second motion vector difference of the current block is obtained based on the first motion vector difference according to the following formula:

$$mvd\_lY = -mvd\_lX.$$

Herein, mvd_lY represents the second motion vector difference, mvd_lX represents the first motion vector difference, one of the first motion vector difference and the second motion vector difference belongs to motion information corresponding to the first reference picture list, and the other one of the first motion vector difference and the second motion vector difference belongs to motion information corresponding to the second reference picture list.

In conclusion, according to the bi-directional inter prediction method provided in this application, during bi-directional inter prediction, motion information of all picture blocks in all directions does not need to be transmitted, but only motion information in a specific direction needs to be transmitted. This effectively reduces an amount of transmitted motion information, and improves effective utilization of transmission resources, a transmission rate, and coding compression efficiency.

An embodiment of this application provides a bi-directional inter prediction apparatus. The bi-directional inter prediction apparatus may be a video decoder. Specifically, the bi-directional inter prediction apparatus is configured to perform the steps performed by the video decoder 202 in the foregoing bi-directional inter prediction method. The bi-directional inter prediction apparatus provided in this embodiment of this application may include modules for corresponding steps.

In the embodiments of this application, the bi-directional inter prediction apparatus may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. In the embodiments of this application, division into the modules is an example, and is merely logical function division. There may be another division manner in actual implementation.

Figure 5B:
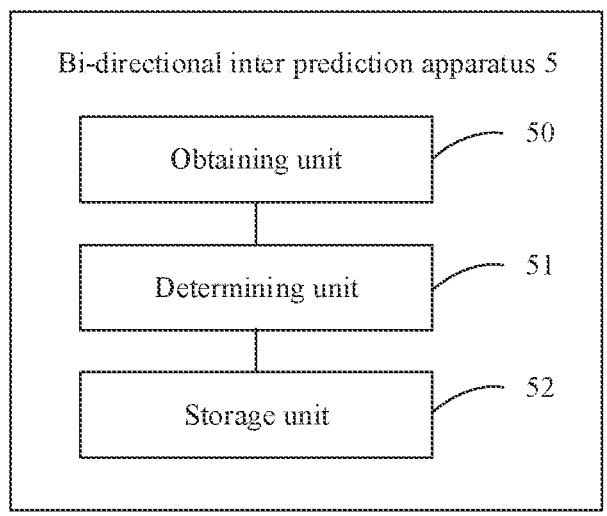
FIG. 5B is a schematic structural diagram of a bi-directional inter prediction apparatus according to an embodiment of this application.

When each function module is obtained through division based on a corresponding function, FIG. 5B is a possible schematic structural diagram of the bi-directional inter prediction apparatus in the foregoing embodiments. As shown in FIG. 5B, the bi-directional inter prediction apparatus 5 includes an obtaining unit 50 and a determining unit 51.

The obtaining unit 50 is configured to support the bi-directional inter prediction apparatus in performing S400, S401, and the like in the foregoing embodiment, and/or another process of the technology described in this specification.

The determining unit 51 is configured to support the bi-directional inter prediction apparatus in performing S402, S403, and the like in the foregoing embodiment, and/or another process of the technology described in this specification.

All related content of the steps in the foregoing method embodiments may be cited in function descriptions of corresponding function modules, and details are not described herein again.

Certainly, the bi-directional inter prediction apparatus provided in this embodiment of this application includes but is not limited to the foregoing modules. For example, the bi-directional inter prediction apparatus may further include a storage unit 52.

The storage unit 52 may be configured to store program code and data of the bi-directional directional inter prediction apparatus.

Figure 5C:
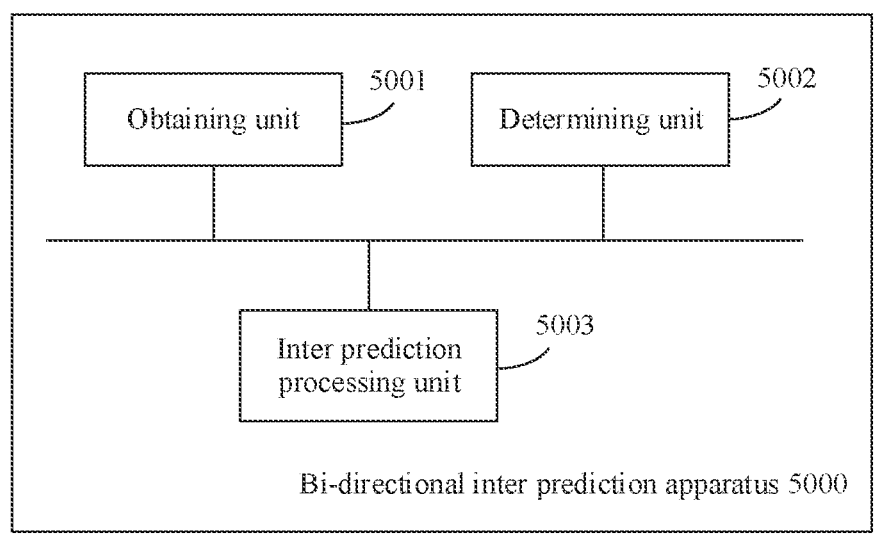
FIG. 5C is a schematic structural diagram of another bi-directional inter prediction apparatus according to an embodiment of this application.

Corresponding to the method in FIG. 5A, in an optional example, the present invention may further provide a bi-directional inter prediction apparatus 5000. Referring to FIG. 5C, the apparatus includes:

a determining unit 5002, configured to determine a reference picture index $i_1$ of a first reference picture list as a first reference picture index that corresponds to a current block and that is of the first reference picture list, where a POC corresponding to the reference picture index $i_1$ is less than a POC of a current picture, a difference obtained by subtracting the POC corresponding to the reference picture index $i_1$ from the POC of the current picture is less than a difference obtained by subtracting a POC corresponding to a reference picture index $i_x$ from the POC of the current picture, the reference picture index $i_x$ is any reference picture index other than the reference picture index it in reference picture indices of the first reference picture list, and the POC corresponding to the reference picture index $i_x$ is less than the POC of the current picture, where the determining unit 5002 is further configured to determine a reference picture index $i_2$ of a second reference picture list as a second reference picture index that corresponds to the current block and that is of the second reference picture list, where a POC corresponding to the reference picture index $i_2$ is greater than the POC of the current picture, a difference obtained by subtracting the POC corresponding to the reference picture index $i_2$ from the POC of the current picture is greater than a difference obtained by subtracting a POC corresponding to a reference picture index $i_y$ from the POC of the current picture, the reference picture index $i_y$ is any reference picture index other than the reference picture index $i_2$ in the reference picture indices of the second reference picture list, and the POC corresponding to the reference picture index $i_y$ is greater than the POC of the current picture; and an inter prediction processing unit 5003, configured to predict the current block based on the first reference picture index and the second reference picture index, where the current picture includes the current block.

Optionally, the apparatus further includes an obtaining unit 5001, configured to obtain a first identifier, where a value of the first identifier is a first preset value, and when the value of the first identifier is the first preset value, the first identifier is used to indicate to determine the reference picture index $i_1$ of the first reference picture list as the first reference picture index that corresponds to the current block and that is of the first reference picture list, and determine the reference picture index $i_2$ of the second reference picture list as the second reference picture index that corresponds to the current block and that is of the second reference picture list.

Optionally, when the first identifier is the first preset value, the first identifier is further used to indicate to determine a second motion vector difference of the current block based on a first motion vector difference of the current block; the obtaining unit is further configured to obtain the first motion vector difference of the current block; and the determining unit is further configured to obtain the second motion vector difference of the current block based on the first motion vector difference according to the following formula:

$$mvd\_lY = -mvd\_lX.$$

Herein, $mvd\_lY$ represents the second motion vector difference, $mvd\_lX$ represents the first motion vector difference, one of the first motion vector difference and the second motion vector difference corresponds to the first reference picture list, and the other one of the first motion vector difference and the second motion vector difference corresponds to the second reference picture list.

Optionally, the obtaining unit 5001 is specifically configured to obtain a first predicted motion vector and a second predicted motion vector; the determining unit 5002 is further configured to: determine a first motion vector based on the first predicted motion vector and the first motion vector difference, and determine a second motion vector based on the second predicted motion vector and the second motion vector difference; and correspondingly, the inter prediction processing unit 5003 is specifically configured to predict the current block based on the first reference picture index, the second reference picture index, the first reference picture list, the second reference picture list, the first motion vector, and the second motion vector.

The obtaining unit 5001 may be configured to perform the related method mentioned in S500 in the foregoing example and a method that can be used for equivalent replacement. The determining unit 5002 may be configured to perform the related method mentioned in S501 and/or S502 in the foregoing example and a method that can be used for equivalent replacement. The obtaining unit 5001, the determining unit 5002, and the inter prediction processing unit 5003 may be configured to perform the related method mentioned in S503 in the foregoing example and a method that can be used for equivalent replacement. The obtaining unit 5001, the determining unit 5002, and the inter prediction processing unit 5003 may be implemented by a processor by invoking a corresponding program instruction in a memory.

It should be understood that the foregoing specific method examples, explanations and descriptions of technical features in the embodiments, and extensions of a plurality of implementations are also applicable to corresponding method execution in the apparatus, and details are not described in the apparatus embodiments.

Figure 6A:
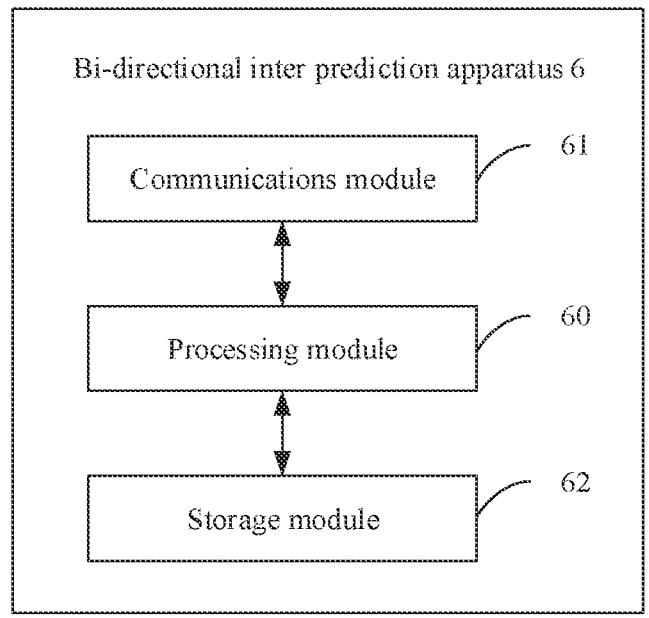
FIG. 6A is a schematic structural diagram of still another bi-directional inter prediction apparatus according to an embodiment of this application.

When an integrated unit is used, FIG. 6A is a schematic structural diagram of a bi-directional inter prediction apparatus according to an embodiment of this application. In FIG. 6A, the bi-directional inter prediction apparatus 6 includes a processing module 60 and a communications module 61. The processing module 60 is configured to control and manage an action of the bi-directional inter prediction apparatus, for example, perform the methods or steps performed by the obtaining unit 50 and the determining unit 51 and the methods or steps performed by the obtaining unit 5001, the determining unit 5002, and the inter prediction processing unit 5003, and; or another process of the technology described in this specification. The communications module 61 is configured to support interaction between the bi-directional inter prediction apparatus and another device. As shown in FIG. 6A, the bi-directional inter prediction apparatus may further include a storage module 62. The storage module 62 is configured to store program code and data of the bi-directional inter prediction apparatus, for example, store content stored by the storage unit 52.

The processing module 60 may be a processor or a controller, for example, may be a central processing unit (Central Processing Unit, CPU), a general-purpose processor, a digital signal processor (Digital Signal Processor, DSP), an ASIC, an FPGA or another programmable logic device, a transistor logic device, a hardware component, or any combination thereof. The processor or the controller may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The communications module 61 may be a transceiver, an RF circuit, a communications interface, or the like. The storage module 62 may be a memory.

All related content of the scenarios in the foregoing method embodiments may be cited in function description of the corresponding function modules. Details are not described herein again.

Both the bi-directional inter prediction apparatus 5 and the bi-directional inter prediction apparatus 6 may perform the foregoing method (such as but not limited to the bi-directional inter prediction method shown in FIG. 4). The bi-directional inter prediction apparatus 5 and the bi-directional inter prediction apparatus 6 may be specifically video decoding apparatuses or other devices with a video coding function. The bi-directional inter prediction apparatus 5 and the bi-directional inter prediction apparatus 6 may be configured to perform picture prediction in a decoding process.

This application further provides a terminal. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the bi-directional inter prediction method in the embodiments of this application.

The terminal herein may be a video display device, a smartphone, a portable computer, or another device that can process or play a video.

This application further provides a video decoder, including, a non-volatile storage medium and a central processing unit. The non-volatile storage medium stores an executable program. The central processing unit is connected to the non-volatile storage medium, and executes the executable program to perform the bi-directional inter prediction method in the embodiments of this application.

This application further provides a decoder. The decoder includes the bi-directional inter prediction apparatus (the bi-directional inter prediction apparatus 5 or the bi-directional inter prediction apparatus 6) in the embodiments of this application, and a reconstruction module. The reconstruction module is configured to determine a reconstructed sample value of a current block based on a prediction sample obtained by the bi-directional inter prediction apparatus.

Another embodiment of this application further provides a computer-readable storage medium. The computer-readable storage medium includes one or more pieces of program code. The one or more programs include an instruction. When a processor of a terminal executes the program code, the terminal performs the bi-directional inter prediction method shown in the foregoing method examples (such as but not limited to FIG. 4 or FIG. 5A).

In another embodiment of this application, a computer program product is further provided. The computer program product includes a computer-executable instruction. The computer-executable instruction is stored in a computer-readable storage medium. At least one processor of a terminal may read the computer-executable instruction from the computer-readable storage medium. The at least one processor executes the computer-executable instruction, to enable the terminal to perform the foregoing methods (such as but not limited to the bi-directional inter prediction method shown in FIG. 4 or FIG. 5A), and methods or steps that can be implemented by the video decoder 202.

Figure 6B:
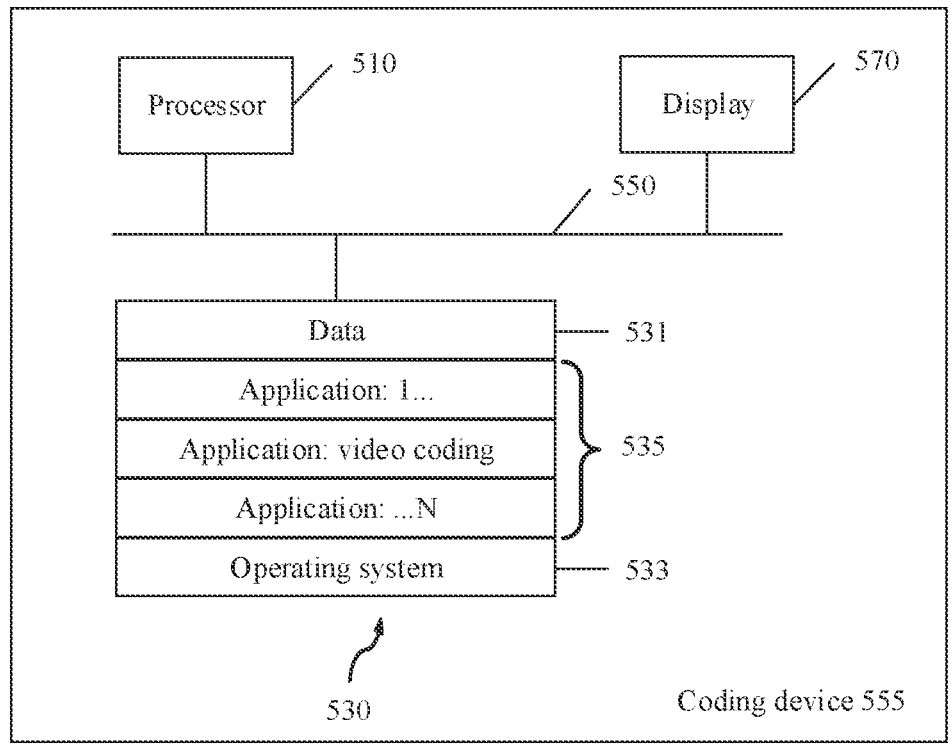
FIG. 6B is a schematic structural diagram of a coding apparatus according to an embodiment of this application.

FIG. 6B is a simplified block diagram of an apparatus that can be used as either or two of the source apparatus 10 and the destination apparatus 20 in FIG. 1 according to an example embodiment. The apparatus 555 can implement the technologies of this application. In other words, FIG. 6B is a schematic block diagram of an implementation of an encoding device or a decoding device (briefly referred to as a coding device 555) according to an embodiment of this application. The coding device 555 may include a processor 510, a memory 530, and a bus system 550. The processor and the memory are connected through the bus system. The memory is configured to store an instruction. The processor is configured to execute the instruction stored in the memory. The memory of the coding device stores program code, and the processor may invoke the program code stored in the memory to perform various video picture encoding or decoding methods described in this application, especially video encoding or decoding methods in various inter prediction modes or intra prediction modes. To avoid repetition, details are not described herein again.

The following describes application of the encoding method and the decoding method shown in the foregoing embodiments, and a system using the encoding method and the decoding method.

Figure 7:
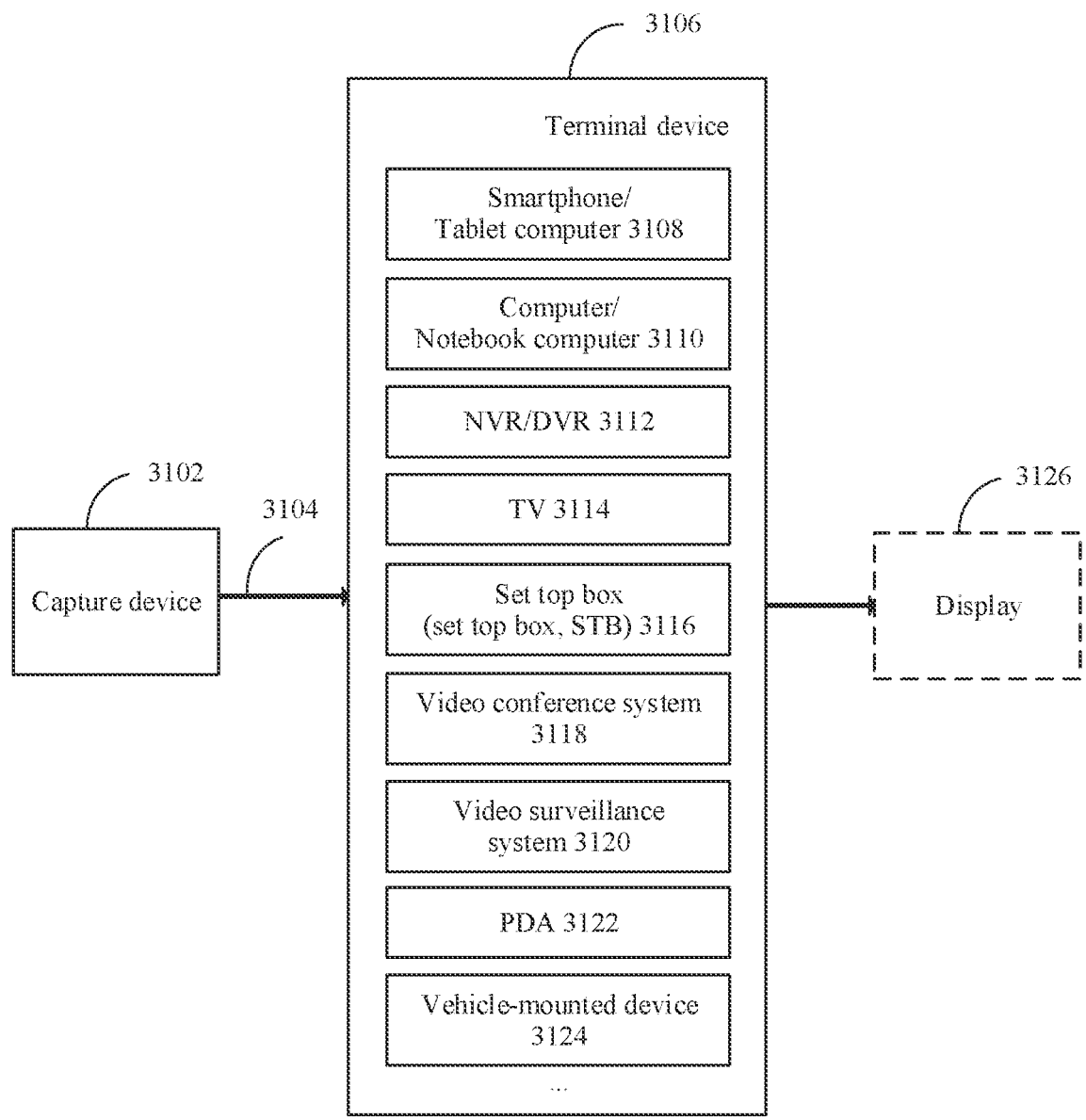
FIG. 7 is a block diagram of an example structure of a content supply system 3100 that implements a content delivery service.

FIG. 7 is a block diagram of a content supply system 3100 that implements a content delivery service. The content supply system 3100 includes a capture device 3102, a terminal device 3106, and optionally a display 3126. The capture device 3102 communicates with the terminal device 3106 through a communication link 3104. The communication link may include a communications channel 13. The communication link 3104 includes but is not limited to Wi-Fi, the Ethernet, a wired connection, a wireless (3G/4G/5G) connection, a USB, or any type of combination thereof.

The capture device 3102 generates data, and may encode the data according to the encoding method shown in the foregoing embodiments. Alternatively, the capture device 3102 may distribute the data to a streaming server (not shown in the figure), and the server encodes the data and transmits the encoded data to the terminal device 3106. The capture; device 3102 includes but is not limited to a camera, a smartphone or a tablet computer, a computer or a notebook computer, a video conference system, a PDA, a vehicle-mounted device, or any combination thereof. For example, the capture device 3102 may include the source apparatus 10 described above. When the data includes a video, the video encoder 102 included in the capture device 3102 may actually encode the video. When the data includes audio (that is, voice), an audio encoder included in the capture device 3102 may actually encode the audio. In some actual scenarios, the capture device 3102 distributes encoded video data and encoded audio data by multiplexing the encoded video data and the encoded audio data. In another actual scenario, for example, in a video conference system, the encoded audio data and the encoded video data are not multiplexed. The capture device 3102 separately distributes the encoded audio data and the encoded video data to the terminal device 3106.

In the content supply system 3100, the terminal device 3106 receives and reproduces the encoded data. The terminal device 3106 may be a device with data receiving and recovery capabilities, for example, a smartphone or tablet computer 3108, a computer or notebook computer 3110, a network video recorder (network video recorder, NVR)/digital video recorder (digital video recorder. DVR) 3112, a TV 3114, a set top box (set top box, STB) 3116, a video conference system 3118, a video surveillance system 3120, a personal digital assistant (personal digital assistant, PDA) 3122, a vehicle-mounted device 3124, or any combination of the foregoing devices that can decode the encoded data. For example, the terminal device 3106 may include the destination apparatus 20 described above. When the encoded data includes a video, a video decoder 202 included in the terminal device is prioritized to perform video decoding. When the encoded data includes audio, an audio decoder included in the terminal device is prioritized to perform audio decoding.

For a terminal device having a display, for example, a smartphone or tablet computer 3108, a computer or notebook computer 3110, a network video recorder (network video recorder, NVR)/digital video recorder (digital video recorder, DVR) 3112, a TV 3114, a personal digital assistant (personal digital assistant, PDA) 3122, or a vehicle-mounted device 3124, the terminal device may feed decoded data to the display of the terminal device. For a terminal device without a display, tier example, an STB 3116, a video conference system 3118, or a video surveillance system 3120, an external display 3126 is connected to the terminal device to receive and display decoded data.

When each device in the system performs encoding or decoding, the picture encoding device or the picture decoding device shown in the foregoing embodiments may be used.

Figure 8:
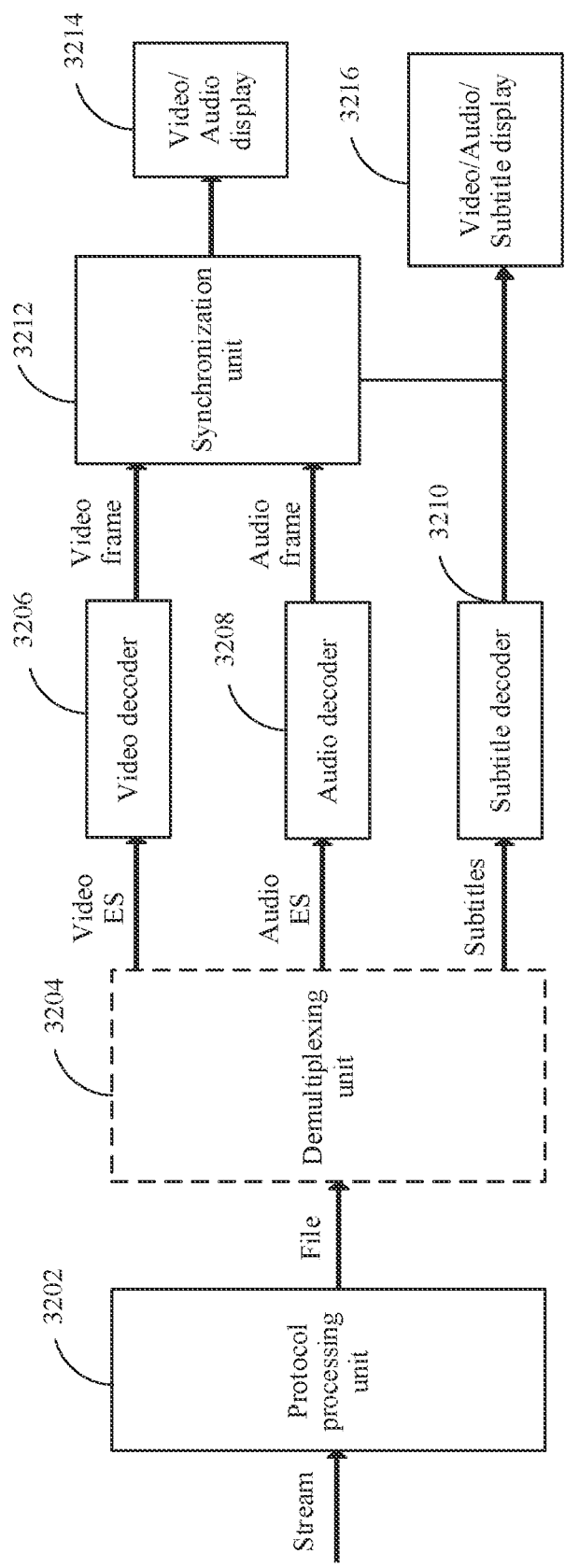
FIG. 8 is a block diagram of an example structure of a terminal device.

FIG. 8 is a diagram of an example structure of the terminal device 3106. After the terminal device 3106 receives a stream from the capture device 3102, a protocol processing unit 3202 analyzes a transport protocol of the stream. The protocol includes but is not limited to a real-time streaming protocol (Real-Time Streaming Protocol, RTSP), a hypertext transfer protocol (Hypertext Transfer Protocol, HTTP), an HTTP live streaming protocol (HTTP Live streaming protocol, HLS), an MPEG-DASH, a real-time transport protocol (Real-time Transport protocol, RIP), a real-time messaging protocol (Real-Time Messaging Protocol, RTMP), or any combination thereof.

After processing the stream, the protocol processing unit 3202 generates a stream file. The file is output to a demultiplexing unit 3204. The demultiplexing unit 3204 may split multiplexed data into encoded audio data and encoded video data. As described above, in another actual scenario, for example, in a video conference system, the encoded audio data and the encoded video data are not multiplexed. In this case, the encoded data is transmitted to a video decoder 3206 and an audio decoder 3208 without being transmitted through the demultiplexing unit 3204.

Demultiplexing is performed to generate a video elementary stream (elementary stream, ES), an audio ES, and optional subtitles. The video decoder 3206 includes the video decoder 202 described in the foregoing embodiments, decodes the video ES according to the decoding method shown in the foregoing embodiments to generate a video picture, and feeds such data to a synchronization unit 3212. The audio decoder 3208 decodes the audio ES to generate an audio picture, and feeds such data to the synchronization unit 3212. Alternatively, the video picture may be stored in a buffer (not shown in FIG. 8) before the video picture is fed to the synchronizing unit 3212. Similarly, the audio picture may be stored in the buffer (not shown in FIG. 8) before the audio picture is fed to the synchronizing unit 3212.

The synchronization unit 3212 synchronizes the video picture and the audio picture, and provides a video/audio for a video/audio display 3214. For example, the synchronization unit 3212 synchronizes presentation of video information and audio information. Information may be encoded syntactically by using a timestamp related to presentation of encoded audio and visual data and a timestamp related to transmission of a data stream.

If subtitles are included in the stream, a subtitle decoder 3210 decodes the subtitles to synchronize the subtitles with the video picture and the audio picture, and provides the video/audio/subtitles for a video/audio/subtitle display 3216.

The present invention is not limited to the foregoing system, and the picture encoding device or the picture decoding device in the foregoing embodiments may be combined into another system, for example, an automotive system.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated.

The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   determining that a first reference picture index of a first reference picture list is associated with a current block to be predicted, wherein a picture order count (POC) corresponding to the first reference picture index is less than a POC of a current picture that comprises the current block, and wherein the POC corresponding to the first reference picture index is closest in value to the POC of the current picture compared to other reference picture indices with corresponding POCs in the first reference picture list less than the POC of the current picture;
   determining that a second reference picture index of a second reference picture list is associated with the current block, wherein a POC corresponding to the second reference picture index is greater than the POC of the current picture, and wherein the POC corresponding to the second reference picture index is closest in value to the POC of the current picture compared to other reference picture indices with corresponding POCs in the second reference picture list greater than the POC of the current picture; and
   predicting the current block based on the first reference picture index and the second reference picture index, wherein the first reference picture list is searched to find the first reference picture index and the second reference picture list is searched to find the second reference picture index, and if one or both of the first reference picture index and the second reference picture index are not found, the second reference picture list is then searched to find the first reference picture index and the first reference picture list is searched to find the second reference picture index.

2. The method according to claim 1, further comprising:
identifying an identifier, wherein a value of the identifier is a preset value indicating an association between the first reference picture index and the current block and an association between the second reference picture index and the current block, wherein determining the first reference picture index is associated with the current block and determining the second reference picture index is associated with the current block are performed based on the preset value.

3. The method according to claim 2, further comprising:
determining a first motion vector difference of the current block based on the preset value; and
determining a second motion vector difference of the current block based on the first motion vector difference.

4. The method according to claim 3, wherein the second motion vector difference of the current block is determined based on the first motion vector difference according to the following equation:

$$mvd\_lY=-mvd\_lX, \text{ wherein}$$

mvd_lY represents the second motion vector difference, mvd_lX represents the first motion vector difference.

5. The method according to claim 4, wherein each of the first motion vector difference and the second motion vector difference corresponds to a different one of the first reference picture list or the second reference picture list.

6. The method according to claim 3, further comprising:
determining a first predicted motion vector and a second predicted motion vector;
determining a first motion vector based on the first predicted motion vector and the first motion vector difference;
determining a second motion vector based on the second predicted motion vector and the second motion vector difference; and
wherein predicting the current block based on the first reference picture index and the second reference picture index comprises:
predicting the current block based on the first reference picture index, the second reference picture index, the first reference picture list, the second reference picture list, the first motion vector, and the second motion vector.

7. An apparatus comprising:
at least one processor;
one or more memories coupled to the at least one processor and storing programming instructions for execution by the at least one processor to perform operations comprising:
determining that a first reference picture index of a first reference picture list is associated with a current block to be predicted, wherein a picture order count (POC) corresponding to the first reference picture index is less than a POC of a current picture that comprises the current block, and wherein the POC corresponding to the first reference picture index is closest in value to the POC of the current picture compared to other reference picture indices with corresponding POCs in the first reference picture list less than the POC of the current picture;
determining that a second reference picture index of a second reference picture list is associated with the current block, wherein a POC corresponding to the second reference picture index is greater than the POC of the current picture, and wherein the POC corresponding to the second reference picture index is closest in value to the POC of the current picture compared to other reference picture indices with corresponding POCs in the second reference picture list greater than the POC of the current picture; and
predicting the current block based on the first reference picture index and the second reference picture index, wherein the first reference picture list is searched to find the first reference picture index and the second reference picture list is searched to find the second reference picture index, and if one or both of the first reference picture index and the second reference picture index are not found, the second reference picture list is then searched to find the first reference picture index and the first reference picture list is searched to find the second reference picture index.

8. The apparatus according to claim 7, the operations further comprising:
identifying an identifier, wherein a value of the identifier is a preset value indicating an association between the first reference picture index and the current block and an association between the second reference picture index and the current block, wherein determining the first reference picture index is associated with the current block and determining the second reference picture index is associated with the current block are performed based on the preset value.

9. The apparatus according to claim 8, the operations further comprising:
determining a first motion vector difference of the current block based on the preset value; and
determining a second motion vector difference of the current block based on the first motion vector difference.

10. The apparatus according to claim 9, wherein the second motion vector difference of the current block is determined based on the first motion vector difference according to the following equation:

$$mvd\_lY=-mvd\_lX, \text{ wherein}$$

mvd_lY represents the second motion vector difference, mvd_lX represents the first motion vector difference.

11. The apparatus according to claim 10, wherein each of the first motion vector difference and the second motion vector difference corresponds to a different one of the first reference picture list or the second reference picture list.

12. The apparatus according to claim 9, the operations further comprising:
determining a first predicted motion vector and a second predicted motion vector;
determining a first motion vector based on the first predicted motion vector and the first motion vector difference; and
determining a second motion vector based on the second predicted motion vector and the second motion vector difference; and
wherein predicting the current block based on the first reference picture index and the second reference picture index comprises:
predicting the current block based on the first reference picture index, the second reference picture index, the first reference picture list, the second reference picture list, the first motion vector, and the second motion vector.

13. A non-transitory storage medium storing a bitstream and one or more instructions executable by at least one processor to perform operations of encoding or decoding of the bitstream, the operations comprising:

determining that a first reference picture index of a first reference picture list is associated with a current block to be predicted, wherein a picture order count (POC) corresponding to the first reference picture index is less than a POC of a current picture that comprises the current block, and wherein the POC corresponding to the first reference picture index is closest in value to the POC of the current picture compared to other reference picture indices with corresponding POCs in the first reference picture list less than the POC of the current picture;

determining that a second reference picture index of a second reference picture list is associated with the current block, wherein a POC corresponding to the second reference picture index is greater than the POC of the current picture, and wherein the POC corresponding to the second reference picture index is closest in value to the POC of the current picture compared to other reference picture indices with corresponding POCs in the second reference picture list greater than the POC of the current picture; and predicting the current block based on the first reference picture index and the second reference picture index, wherein the first reference picture list is searched to find the first reference picture index and the second reference picture list is searched to find the second reference picture index, and if one or both of the first reference picture index and the second reference picture index are not found, the second reference picture list is then searched to find the first reference picture index and the first reference picture list is searched to find the second reference picture index.

14. The non-transitory storage medium according to claim 13, the operations further comprising:

identifying an identifier, wherein a value of the identifier is a preset value indicating an association between the first reference picture index and the current block and an association between the second reference picture index and the current block, wherein determining the first reference picture index is associated with the current block and determining the second reference picture index is associated with the current block are performed based on the preset value.

15. The non-transitory storage medium according to claim 14, the operations further comprising:

determining a first motion vector difference of the current block based on the preset value; and determining a second motion vector difference of the current block based on the first motion vector difference.

16. The non-transitory storage medium according to claim 15, wherein the second motion vector difference of the current block is determined based on the first motion vector difference according to the following equation:

$$mvd\_lY = -mvd\_lX, \text{ wherein}$$

$mvd\_lY$ represents the second motion vector difference, $mvd\_lX$ represents the first motion vector difference.

17. The non-transitory storage medium according to claim 16, wherein each of the first motion vector difference and the second motion vector difference corresponds to a different one of the first reference picture list or the second reference picture list.

18. The non-transitory storage medium according to claim 15, the operations further comprising:

determining a first predicted motion vector and a second predicted motion vector;

determining a first motion vector based on the first predicted motion vector and the first motion vector difference; and determining a second motion vector based on the second predicted motion vector and the second motion vector difference; and wherein predicting the current block based on the first reference picture index and the second reference picture index comprises:

predicting the current block based on the first reference picture index, the second reference picture index, the first reference picture list, the second reference picture list, the first motion vector, and the second motion vector.

* * * * *